(12) United States Patent
Sheppard et al.

(10) Patent No.: US 11,854,030 B2
(45) Date of Patent: Dec. 26, 2023

(54) METHODS AND APPARATUS TO ESTIMATE CARDINALITY ACROSS MULTIPLE DATASETS REPRESENTED USING BLOOM FILTER ARRAYS

(71) Applicant: The Nielsen Company (US), LLC, New York, NY (US)

(72) Inventors: Michael Sheppard, Holland, MI (US); Jonathan Sullivan, Hurricane, UT (US); Diane Morovati Lopez, West Hills, CA (US); Jake Ryan Dailey, San Francisco, CA (US); Christie Nicole Summers, Baltimore, MD (US); Molly Poppie, Arlington Heights, IL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 17/362,404

(22) Filed: Jun. 29, 2021

(65) Prior Publication Data

US 2023/0004997 A1    Jan. 5, 2023

(51) Int. Cl.
  *G06Q 10/00*    (2023.01)
  *G06Q 30/0204*  (2023.01)
  *G06F 16/22*    (2019.01)
  *G06Q 30/0201*  (2023.01)

(52) U.S. Cl.
  CPC ......... *G06Q 30/0204* (2013.01); *G06F 16/22* (2019.01); *G06Q 30/0201* (2013.01)

(58) Field of Classification Search
  None
  See application file for complete search history.

(56) References Cited

U.S. PATENT DOCUMENTS 6,108,637 A   8/2000  Blumenau
8,370,489 B2  2/2013  Mazumdar et al.
(Continued)

FOREIGN PATENT DOCUMENTS

CN   106874165   6/2017
JP   2011182163  9/2011

OTHER PUBLICATIONS

Kanaujia, Vishal, Exploring Probabilistic Data Structures: Bloom Filters, May 2, 2018, OpenSource, https://www.opensourceforu.com/2018/05/exploring-probabilistic-data-structures-bloom-filters/, p. 1-6. (Year: 2018).*

(Continued)

*Primary Examiner* — Joseph M Waesco

(57) ABSTRACT

Methods and apparatus to estimate cardinality across multiple datasets represented using Bloom filter arrays are disclosed. Disclosed examples include processor circuitry to execute and/or instantiate instructions to determine an inclusion-exclusion expression that defines an audience size for a user group of interest. Terms in the inclusion-exclusion expression corresponding to either a first cardinality of a first one of at least three Bloom filter arrays or a second cardinality of a union of two or more of the Bloom filter arrays. Different ones of the Bloom filter arrays representative of different sets of users who accessed media. The at least one processor further to estimate, based on the inclusion-exclusion expression, the audience size of the user group of interest.

30 Claims, 13 Drawing Sheets

(56) References Cited

U.S. PATENT DOCUMENTS

| | | | |
|---|---|---|---|
| 8,600,921 B2* | 12/2013 | Burkard | G06F 3/04847 |
| | | | 706/45 |
| 8,930,701 B2 | 1/2015 | Burbank et al. | |
| 9,237,138 B2 | 1/2016 | Bosworth et al. | |
| 9,361,322 B1 | 6/2016 | Dutta et al. | |
| 9,596,202 B1 | 3/2017 | Beach et al. | |
| 10,963,922 B1* | 3/2021 | Andersen | G06Q 30/0255 |
| 11,216,588 B1* | 1/2022 | An | G06F 21/6227 |
| 2009/0296594 A1 | 12/2009 | Cao et al. | |
| 2010/0070514 A1 | 3/2010 | Woodruff | |
| 2014/0149433 A1 | 5/2014 | Lakshminarayan et al. | |
| 2015/0178769 A1* | 6/2015 | Mirisola | G06Q 30/0246 |
| | | | 705/14.45 |
| 2016/0048868 A1* | 2/2016 | Mirisola | G06Q 30/0245 |
| | | | 705/14.44 |
| 2016/0292716 A1* | 10/2016 | Mirisola | G06F 7/24 |
| 2017/0103417 A1* | 4/2017 | Nguyen | G06F 16/24545 |
| 2017/0323200 A1 | 11/2017 | Corvinelli et al. | |
| 2018/0349364 A1* | 12/2018 | Arnold | G06F 16/901 |
| 2019/0026221 A1 | 1/2019 | Bar-Joshua et al. | |
| 2019/0272388 A1 | 9/2019 | Tsou et al. | |
| 2021/0117428 A1 | 4/2021 | Dalgliesh | |
| 2021/0248629 A1 | 8/2021 | Sullivan et al. | |
| 2021/0359836 A1* | 11/2021 | Wright | H04L 9/008 |
| 2021/0359846 A1* | 11/2021 | Wright | H04L 9/0643 |
| 2021/0406240 A1 | 12/2021 | Sheppard et al. | |
| 2022/0036390 A1 | 2/2022 | Sheppard et al. | |
| 2022/0084074 A1* | 3/2022 | Maddern | G06Q 30/0243 |
| 2022/0138831 A1* | 5/2022 | Yoo | G06Q 30/0631 |
| | | | 705/7.33 |
| 2022/0261853 A1* | 8/2022 | Publicover | G06F 16/2358 |

OTHER PUBLICATIONS

Hilda Geiringer, "On the Probability Theory of Arbitrarily Linked Events," Institute of Mathematical Statistics, Dec. 1938, 12 pages.

Johnson et al., "Urn Models and Their Application an Approach to Modern Discrete Probability Theory," John Wiley & Sons, Inc., 1977, 413 pages.

Wikipedia, "Bloom Filter," available at https://en.wikipedia.org/w/index.php?title=Bloom_filter&oldid=939717097, Last edited Feb. 8, 2020, 21 pages.

Wikipedia, "Brent's method," available at https://en.wikipedia.org/w/index.php?title=Brent%27s_method&oldid=938763926, Last edited Feb. 2, 2020, 6 pages.

Wikipedia, "Differential privacy," available at https://en.wikipedia.org/w/index.php?title=Differential_privacy&oldid=937350827, Last edited Jan. 24, 2020, 10 pages.

"LinearLegions: A Linear Size Cardinality Estimator" Technical Disclosure Commons, (Nov. 29, 2020) available at https://www.tdcommons.org/dpubs_series/3830, 20 pages.

Tschorsch et al., "An algorithm for privacy-preserving distributed user statistics," Computer Engineering Group, Humboldt University of Berlin, Unter den Linden 6, DE 10099 Berlin, Germany, Jul. 1, 2013, 13 pages.

Erlingsson et al., "RAPPOR: Randomized Aggregatable Privacy-Preserving Ordinal Response," Proceedings of the 2014 ACM SIGSAC Conference on Computer and Communications Security Nov. 2014, 14 pages.

Wright et al., "Privacy-Preserving Secure Cardinality and Frequency Estimation," Google LLC, May 29, 2020, 20 pages.

International Searching Authority, "Written Opinion," issued in connection with International application No. PCT/US2021/016773, dated May 25, 2021, 3 pages.

International Searching Authority, "International Search Report," issued in connection with International application No. PCT/US2021/016773, dated May 25, 2021, 3 pages.

United States Patent and Trademakr Office, "Non Final Office Action", issued in connection with U.S. Appl. No. 17/007,774, dated Feb. 17, 2022, 12 pages.

Swamidass et al. "Mathematical Correction for Fingerprint Similarity Measures to Improve Chemical Retrieval," J. Chem. Inf. Model. 2007, 47, 952-964, Nov. 20, 2006, 13 pages.

Burton H. Bloom "Space/Time Trade offs in Hash Coding Errors," Computer Usage Company, vol. 13 No. Jul. 7, 1970, 5 pages.

Dong et al. "Approximating Private Set Union/Intersection Cardinality with Logarithmic Complexity", Jun. 28, 2017, 21 pages.

Many et al. "Fast Private Set Operations with SEPIA", Mar. 1, 2012, 11 pages.

David Stritzl, "Privacy Preserving Matching Using Bloom Filters: An Analysis and an Encrypted Variant", Apr. 4, 2019, 31 pages.

Border et al. "Network Application of Bloom Filters: A Survey", Apr. 14, 2004, 27 pages.

Shi et al. "Audience Size Forecasting", Aug. 2018, 10 pages.

United States Patent and Trademark Office Final Office Action, issued in connection with U.S. Appl. No. 17/007,774, dated Jul. 1, 2022, 18 pages.

United States Patent and Trademark Office, "Non-Final Office Action," issued in connection with U.S. Appl. No. 17/362,419, dated Dec. 5, 2022, 11 pages.

European Patent Office, "Rule 161(2) and 162 EPC," issued in connection with European Patent Application No. 21754558.1, dated Sep. 20, 2022, 3 pages.

International Searching Authority, "International Preliminary Report on Patentability," issued in connection with International Patent Application No. PCT/US2021/016773, dated Aug. 25, 2022, 5 pages.

United States Patent and Trademark Office, "Advisory Action," issued in connection with U.S. Appl. No. 17/007,774, dated Oct. 31, 2022, 4 pages.

United States Patent and Trademark Office, "Non-Final Office Action," issues in connection with U.S. Appl. No. 16/945,055, dated Sep. 15, 2022, 8 pages.

United States Patent and Trademark Office, "Notice of Allowance and Fee(s) Due," issued in connection with U.S. Appl. No. 17/362,419, dated Apr. 3, 2023, 6 pages.

United States Patent and Trademark Office, "Notice of Allowance and Fee(s) Due," issued in connection with U.S. Appl. No. 16/945,055, dated Apr. 21, 2023, 10 pages.

Egert et al., "Privately Computing Set-Union and Set-Intersection Cardinality via Bloom Filters," Information Security and Privacy, Jan. 2015, pp. 413-430.

Harmouch et al., "Cardinality estimation: an experimental survey," Proceedings of the VLDB Endowment, Dec. 2017, vol. 11, Issue 4, pp. 499-512.

United States Patent and Trademark Office, "Notice of Allowance and Fee(s) Due," issued in connection with U.S. Appl. No. 17/007,774, dated Jan. 11, 2023, 8 pages.

United States Patent and Trademark Office, "Final Office Action," issued in connection with U.S. Appl. No. 16/945,055, dated Jan. 26, 2023, 8 pages.

* cited by examiner

US 11,854,030 B2

METHODS AND APPARATUS TO ESTIMATE CARDINALITY ACROSS MULTIPLE DATASETS REPRESENTED USING BLOOM FILTER ARRAYS

FIELD OF THE DISCLOSURE

This disclosure relates generally to monitoring media exposure and, more particularly, to methods and apparatus to estimate cardinality across multiple datasets represented using Bloom filter arrays.

BACKGROUND

Traditionally, audience measurement entities determine audience exposure to media based on registered panel members. That is, an audience measurement entity (AME) enrolls people who consent to being monitored into a panel. The AME then monitors those panel members to determine media (e.g., television programs or radio programs, movies, DVDs, advertisements, webpages, streaming media, etc.) exposed to those panel members. In this manner, the AME can determine exposure metrics (e.g., audience size) for different media based on the collected media measurement data.

As people are accessing more and more media through digital means (e.g., via the Internet), it is possible for online publishers and/or database proprietors providing such media to track all instances of exposure to media (e.g., on a census wide level) rather than being limited to exposure metrics based on audience members enrolled as panel members of an AME. However, database proprietors are typically only able to track media exposure pertaining to online activity associated with the platforms operated by the database proprietors. Where media is delivered via multiple different platforms of multiple different database proprietors, no single database proprietor will be able to provide exposure metrics across the entire population to which the media was made accessible. Furthermore, such database proprietors have an interest in preserving the privacy of their users such that there are limitations on the nature of the exposure metrics such database proprietors are willing to share with one another and/or an interested third party such as an AME.

Figure 1:
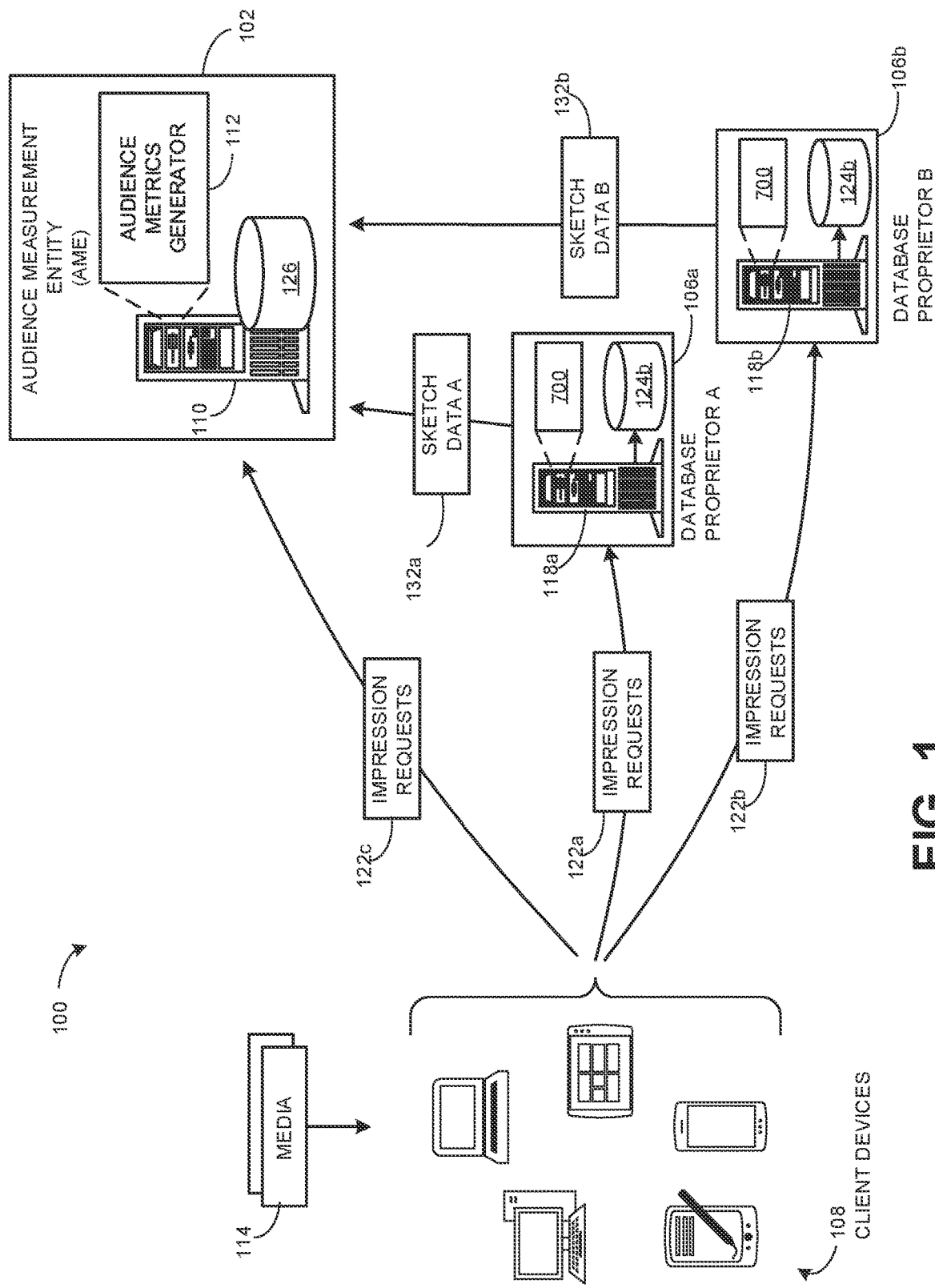
FIG. 1 is an example environment to implement a technique for logging impressions of accesses to server-based media.

The figures are not necessarily to scale. In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein "substantially real time" refers to occurrence in a near instantaneous manner recognizing there may be real world delays for computing time, transmission, etc. Thus, unless otherwise specified, "substantially real time" refers to real time+/−1 second.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Techniques for monitoring user access to an Internet-accessible media, such as digital television (DTV) media and digital content ratings (DCR) media, have evolved significantly over the years. Internet-accessible media is also known as digital media. In the past, such monitoring was done primarily through server logs. In particular, entities serving media on the Internet would log the number of requests received for their media at their servers. Basing Internet usage research on server logs is problematic for several reasons. For example, server logs can be tampered with either directly or via zombie programs, which repeatedly request media from the server to increase the server log counts. Also, media is sometimes retrieved once, cached locally and then repeatedly accessed from the local cache without involving the server. Server logs cannot track such repeat views of cached media. Thus, server logs are susceptible to both over-counting and under-counting errors.

The inventions disclosed in Blumenau, U.S. Pat. No. 6,108,637, which is hereby incorporated herein by reference in its entirety, fundamentally changed the way Internet monitoring is performed and overcame the limitations of the server-side log monitoring techniques described above. For example, Blumenau disclosed a technique wherein Internet media to be tracked is tagged with monitoring instructions. In particular, monitoring instructions are associated with the hypertext markup language (HTML) of the media to be tracked. When a client requests the media, both the media and the monitoring instructions are downloaded to the client. The monitoring instructions are, thus, executed whenever the media is accessed, be it from a server or from a cache. Upon execution, the monitoring instructions cause the client to send or transmit monitoring information from the client to a content provider site. The monitoring information is indicative of the manner in which content was displayed.

In some implementations, an impression request or ping request can be used to send or transmit monitoring information by a client device using a network communication in the form of a hypertext transfer protocol (HTTP) request. In this manner, the impression request or ping request reports the occurrence of a media impression at the client device. For example, the impression request or ping request includes information to report access to a particular item of media (e.g., an advertisement, a webpage, an image, video, audio, etc.). In some examples, the impression request or ping request can also include a cookie previously set in the browser of the client device that may be used to identify a user that accessed the media. That is, impression requests or ping requests cause monitoring data reflecting information about an access to the media to be sent from the client device that downloaded the media to a monitoring entity and can provide a cookie to identify the client device and/or a user of the client device. In some examples, the monitoring entity is an audience measurement entity (AME) that did not provide the media to the client and who is a trusted (e.g., neutral) third party for providing accurate usage statistics (e.g., The Nielsen Company, LLC). Since the AME is a third party relative to the entity serving the media to the client device, the cookie sent to the AME in the impression request to report the occurrence of the media impression at the client device is a third-party cookie. Third-party cookie tracking is used by measurement entities to track access to media accessed by client devices from first-party media servers.

There are many database proprietors operating on the Internet. These database proprietors provide services to large numbers of subscribers. In exchange for the provision of services, the subscribers register with the database proprietors. As part of this registration, the subscribers may provide personally identifiable information (PII) including, for example, their name, their home address, their email address, etc. that is stored in a database operated and/or maintained by the database proprietor. Examples of such database proprietors include social network sites (e.g., Facebook, Twitter, MySpace, etc.), multi-service sites (e.g., Yahoo!, Google, Axiom, Catalina, etc.), online retailer sites (e.g., Amazon.com, Buy.com, etc.), credit reporting sites (e.g., Experian), streaming media sites (e.g., YouTube, Hulu, etc.), etc. These database proprietors set cookies and/or other device/user identifiers on the client devices of their subscribers to enable the database proprietors to recognize their subscribers when they visit their web sites.

The protocols of the Internet make cookies inaccessible outside of the domain (e.g., Internet domain, domain name, etc.) on which they were set. Thus, a cookie set in, for example, the facebook.com domain (e.g., a first party) is accessible to servers in the facebook.com domain, but not to servers outside that domain. Therefore, although AMEs (e.g., third parties) might find it advantageous to access the cookies set by the database proprietors, they are unable to do so.

The inventions disclosed in Mazumdar et al., U.S. Pat. No. 8,370,489, which is incorporated by reference herein in its entirety, enable an AME to leverage the existing databases of database proprietors to collect more extensive Internet usage by extending the impression request process to encompass partnered database proprietors and by using such partners as interim data collectors. The inventions disclosed in Mazumdar accomplish this task by structuring the AME to respond to impression requests from clients (who may not be a member of an audience measurement panel and, thus, may be unknown to the AME) by redirecting the clients from the AME to a database proprietor, such as a social network site partnered with the AME, using an impression response. Such a redirection initiates a communication session between the client accessing the tagged media and the database proprietor. For example, the impression response received at the client device from the AME may cause the client device to send a second impression request to the database proprietor. In response to the database proprietor receiving this impression request from the client device, the database proprietor (e.g., Facebook) can access any cookie it has set on the client to thereby identify the client based on the internal records of the database proprietor. In the event the client device corresponds to a subscriber of the database proprietor, the database proprietor logs/records a database proprietor demographic impression in association with the user/client device.

As used herein, an impression is defined to be an event in which a home or individual accesses and/or is exposed to media (e.g., an advertisement, content, a group of advertisements and/or a collection of content). In Internet media delivery, a quantity of impressions or impression count is the total number of times media (e.g., content, an advertisement, or advertisement campaign) has been accessed by a web population (e.g., the number of times the media is accessed). In some examples, an impression or media impression is logged by an impression collection entity (e.g., an AME or a database proprietor) in response to an impression request from a user/client device that requested the media. For example, an impression request is a message or communication (e.g., an HTTP request) sent by a client device to an impression collection server to report the occurrence of a media impression at the client device. In some examples, a media impression is not associated with demographics. In non-Internet media delivery, such as television (TV) media, a television or a device attached to the television (e.g., a set-top-box or other media monitoring device) may monitor media being output by the television. The monitoring generates a log of impressions associated with the media displayed on the television. The television and/or connected device may transmit impression logs to the impression collection entity to log the media impressions.

A user of a computing device (e.g., a mobile device, a tablet, a laptop, etc.) and/or a television may be exposed to the same media via multiple devices (e.g., two or more of a mobile device, a tablet, a laptop, etc.) and/or via multiple media types (e.g., digital media available online, digital TV (DTV) media temporality available online after broadcast, TV media, etc.). For example, a user may start watching the Walking Dead television program on a television as part of TV media, pause the program, and continue to watch the program on a tablet as part of DTV media. In such an example, the exposure to the program may be logged by an AME twice, once for an impression log associated with the television exposure, and once for the impression request generated by a tag (e.g., census measurement science (CMS) tag) executed on the tablet. Multiple logged impressions associated with the same program and/or same user are defined as duplicate impressions. Duplicate impressions are problematic in determining total reach estimates because one exposure via two or more cross-platform devices may be counted as two or more unique audience members. As used herein, reach is a measure indicative of the demographic coverage achieved by media (e.g., demographic group(s) and/or demographic population(s) exposed to the media). For example, media reaching a broader demographic base will have a larger reach than media that reaches a more limited demographic base. The reach metric may be measured by tracking impressions for known users (e.g., panelists or non-panelists) for which an audience measurement entity stores demographic information or can obtain demographic information. Deduplication is a process that is necessary to adjust cross-platform media exposure totals by reducing (e.g., eliminating) the double counting of individual audience members that were exposed to media via more than one platform and/or are represented in more than one database of media impressions used to determine the reach of the media.

As used herein, a unique audience (also known as audience size) is based on audience members distinguishable from one another. That is, a particular audience member exposed to particular media is measured as a single unique audience member regardless of how many times that audience member is exposed to that particular media or the particular platform(s) through which the audience member is exposed to the media. If that particular audience member is exposed multiple times to the same media, the multiple exposures for the particular audience member to the same media is counted as only a single unique audience member. In this manner, impression performance for particular media is not disproportionately represented when a small subset of one or more audience members is exposed to the same media an excessively large number of times while a larger number of audience members is exposed fewer times or not at all to that same media. By tracking exposures to unique audience members, a unique audience measure may be used to determine a reach measure to identify how many unique audience members are reached by media. In some examples, increasing unique audience and, thus, reach, is useful for advertisers wishing to reach a larger audience base.

An AME may want to find unique audience/deduplicate impressions across multiple database proprietors, custom date ranges, custom combinations of assets and platforms, etc. Some deduplication techniques perform deduplication across database proprietors using particular systems (e.g., Nielsen's TV Panel Audience Link). For example, such deduplication techniques match or probabilistically link personally identifiable information (PII) from each source. Such deduplication techniques require storing massive amounts of user data or calculating audience overlap for all possible combinations, neither of which are desirable. PII data can be used to represent and/or access audience demographics (e.g., geographic locations, ages, genders, etc.).

In some situations, while the database proprietors may be interested in collaborating with an AME, the database proprietor may not want to share the PII data associated with its subscribers to maintain the privacy of the subscribers. One solution to the concerns for privacy is to share sketch data that provides summary information about an underlying dataset without revealing PII data for individuals that may be included in the dataset. Not only does sketch data assist in protecting the privacy of users represented by the data, but sketch data also serves as a memory saving construct to represent the contents of relatively large databases using relatively small amounts of date. Further, not only does the relatively small size of sketch date offer advantages for memory capacity but it also reduces demands on processor capacity to analyze and/or process such data.

Sketch data may include a cardinality defining the number of individuals (e.g., users or subscribers) represented by the data while maintaining the identity of such individuals private. The cardinality of sketch data associated with media exposure is a useful piece of information for an AME because it provides an indication of the number of audience members exposed to particular media via a platform maintained by the database proprietor providing the sketch data. However, in some instances, sketch data may be provided by database proprietors without providing an indication of the cardinality of the data. Even when the cardinality for sketch data is provided, problems for audience metrics arise when the media may be accessed via multiple different database proprietors that each provide separate sketch data summarizing the individual subscribers that were exposed to the media. In particular, the sum of the cardinalities of each sketch data is not a reliable estimate of the unique audience size because the same individual may be represented in multiple datasets associated with different sketch data. As a result, such individuals will be double counted (or possibly more than twice if there are more than two datasets being aggregated) resulting in the incorrect inflation of the unique audience size. Furthermore, identifying overlap between two different sets of sketch data (e.g., to deduplicate the users represented in the data) is non-trivial because, as stated above, the sketch data is generated to preserve the identity and privacy of the individuals represented thereby. Examples disclosed herein overcome the above challenges by enabling the estimation of a total cardinality of users represented in sketch data associated with two or more different datasets so that an AME may be able to deduplicate individuals represented in more than one of the datasets, thereby enabling the accurate estimate of the unique audience for a particular media item. Furthermore, the cardinality estimation in examples disclosed herein may be made with or without database proprietors providing the dataset-specific cardinalities associated with the different data sketches being combined.

Notably, although third-party cookies are useful for third-party measurement entities in many of the above-described techniques to track media accesses and to leverage demographic information from third-party database proprietors, use of third-party cookies may be limited or may cease in some or all online markets. That is, use of third-party cookies enables sharing anonymous PII subscriber information across entities which can be used to identify and deduplicate audience members across database proprietor impression data. However, to reduce or eliminate the possibility of revealing user identities outside database proprietors by such anonymous data sharing across entities, some websites, internet domains, and/or web browsers will stop (or have already stopped) supporting third-party cookies. This will make it more challenging for third-party measurement entities to track media accesses via first-party servers. That is, although first-party cookies will still be supported and useful for media providers (e.g., database proprietors) to track accesses to media via their own first-party servers, neutral third parties interested in generating neutral, unbiased audience metrics data will not have access to the impression data collected by the first-party servers using first-party cookies. Examples disclosed herein may be implemented with or without the availability of third-party cookies because, as mentioned above, the datasets used in the deduplication process are generated and provided by database proprietors, which may employ first-party cookies to track media impressions from which the datasets (e.g., sketch data) is generated.

Although examples disclosed herein are described in association with audience metrics related to media impressions, examples disclosed herein may be similarly used for other applications to deduplicate between multiple different datasets while preserving privacy. The datasets themselves need not be audiences or email addresses. They could be, for example, bank accounts, lists of purchased items, store visits, traffic patterns, etc. The datasets could be represented as lists of numbers or any other information represented as unique entries in a database.

FIG. 1 shows an example environment 100 that includes an example audience measurement entity (AME) 102, a first example database proprietor 106a, a second example database proprietor 106b, and example client devices 108. The example AME 102 includes an example AME computer 110 that implements an example audience metrics generator 112 to determine audience sizes based on media impressions logged by the database proprietors 106a-b. In the illustrated example of FIG. 1, the AME computer 110 may also implement an impression monitor system to log media impressions reported by the client devices 108. In the illustrated example of FIG. 1, the client devices 108 may be stationary or portable computers, handheld computing devices, smart phones, Internet appliances, smart televisions, and/or any other type of device that may be connected to the Internet and capable of accessing and/or presenting media.

As used herein, an audience size is defined as a number of deduplicated or unique audience members exposed to a media item of interest for audience metrics analysis. A deduplicated or unique audience member is one that is counted only once as part of an audience size. Thus, regardless of whether a particular person is detected as accessing a media item once or multiple times, that person is only counted once in the audience size for that media item. Audience size may also be referred to as unique audience or deduplicated audience.

As used herein, a media impression is defined as an occurrence of access and/or exposure to media 114 (e.g., an advertisement, a movie, a movie trailer, a song, a web page banner, etc.). Examples disclosed herein may be used to monitor for media impressions of any one or more media types (e.g., video, audio, a web page, an image, text, etc.). In examples disclosed herein, the media 114 may be content and/or advertisements. Examples disclosed herein are not restricted for use with any particular type of media. On the contrary, examples disclosed herein may be implemented in connection with tracking impressions for media of any type or form in a network.

In the illustrated example of FIG. 1, content providers and/or advertisers distribute the media 114 via the Internet to users that access websites and/or online television services (e.g., web-based TV, Internet protocol TV (IPTV), etc.). The content providers may be the same as or different entities than the database proprietors 106a-b. In some examples, the media 114 is served by media servers of the same internet domains as the database proprietors 106a-b. For example, the database proprietors 106a-b include corresponding database proprietor servers 118a-b that can serve media 114 to their corresponding subscribers via the client devices 108. Examples disclosed herein can be used to generate audience metrics data that measures audience sizes of media served by different ones of the database proprietors 106a-b. For example, the database proprietors 106a-b may use such audience metrics data to promote their online media serving services (e.g., ad server services, media server services, etc.) to prospective clients. By showing audience metrics data indicative of audience sizes drawn by corresponding ones of the database proprietors 106a-b, the database proprietors 106a-b can sell their media serving services to customers interested in delivering online media to users.

In some examples, the media 114 is presented via the client devices 108. When the media 114 is accessed by the client devices 108, the client devices 108 send impression requests 122a-b to the database proprietor servers 118a-b to inform the database proprietor servers 118a-b of the media accesses. In this manner, the database proprietor servers 118a-b can log media impressions in impression records of corresponding database proprietor audience metrics databases 124a-b. In some examples, when a database proprietor server 118a-b serves the media 114, the impression request 122a-b includes a first-party cookie set by that database proprietor server 118a-b so that the database proprietor server 118a-b can log an impression for the media 114 without using a third-party cookie. In some examples, the client devices 108 also send impression requests 122c to the AME 102 so that the AME 102 can log census impressions in an AME audience metrics database 126. In the illustrated example of FIG. 1, the database proprietors 106a-b log demographic impressions corresponding to accesses by the client devices 108 to the media 114. Demographic impressions are impressions logged in association with demographic information collected by the database proprietors 106a-b from registered subscribers of their services. Also, in the illustrated example of FIG. 1, the AME computer 110 logs census-level media impressions corresponding to accesses by client devices 108 to media 114. Census-level media impressions (e.g., census impressions) are impressions logged regardless of whether demographic information is known for those logged impressions. In some examples, the census impressions include some media impressions accessed via a platform maintained by the first database proprietor 106a and some media impressions accessed via a platform maintained by the second database proprietor 106b. In some examples, the AME computer 110 does not collect impressions, and examples disclosed herein are based on audience data from impressions collected by the database proprietors 106a-b. For instance, the AME computer 110 may not collect impressions if the database proprietors 106a-b do not allow or support third-party cookies on their platforms.

In some examples, the media 114 is encoded to include a media identifier (ID). The media ID may be any identifier or information that can be used to identify the corresponding media 114. In some examples the media ID is an alphanumeric string or value. In some examples, the media ID is a collection of information. For example, if the media 114 is an episode, the media ID may include program name, season number, and/or episode number. When the example media 114 includes advertisements, such advertisements may be content and/or advertisements. The advertisements may be individual, standalone ads and/or may be part of one or more ad campaigns. In some examples, the ads of the illustrated example are encoded with identification codes (e.g., data) that identify the associated ad campaign (e.g., campaign ID, if any), a creative type ID (e.g., identifying a Flash-based ad, a banner ad, a rich type ad, etc.), a source ID (e.g., identifying the ad publisher), and/or a placement ID (e.g., identifying the physical placement of the ad on a screen). In some examples, advertisements tagged with the monitoring instructions are distributed with Internet-based media content such as, for example, web pages, streaming video, streaming audio, IPTV content, etc. As noted above, methods, apparatus, systems, and/or articles of manufacture disclosed herein are not limited to advertisement monitoring but can be adapted to any type of content monitoring (e.g., web pages, movies, television programs, etc.).

In some examples, the media 114 of the illustrated example is tagged or encoded to include monitoring or tag instructions, which are computer executable monitoring instructions (e.g., Java, java script, or any other computer language or script) that are executed by web browsers that access the media 114 via, for example, the Internet. Execution of the monitoring instructions causes the web browser to send the impression requests 122a-c (e.g., also referred to as tag requests) to one or more specified servers of the AME 102, the first database proprietor 106a, and/or the second database proprietor 106b. As used herein, impression requests 122a-c are used by the client devices 108 to report occurrences of media impressions caused by the client devices accessing the media 114. In the illustrated example, the impression requests 122a-b include user-identifying information that the database proprietors 106a-b can use to identify the subscriber that accessed the media 114. For example, when a subscriber of the first database proprietor 106a logs into a server of the first database proprietor 106a via a client device 108, the first database proprietor 106a sets a database proprietor cookie on the client device 108 and maps that cookie to the subscriber's identity/account information at the database proprietor server 118a. In examples disclosed herein, subscriber identity and/or subscriber account information includes personally identifiable information (PII) such as full name, street address, residence city and state, telephone number, email address, age, date of birth, social security number, demographic information, and/or any other personal information provided by subscribers in exchange for services from the database proprietors 106a-b. By having such PII data mapped to database proprietor cookies, the first database proprietor 106a can subsequently identify the subscriber based on the database proprietor cookie to determine when that user accessed different media 114 and to log an impression in association with demographics and/or other PII data of that user. In the illustrated example of FIG. 1, the impression requests 122a-b include database proprietor cookies of the client devices 108 to inform the database proprietors 106a-b of the particular subscribers that accessed the media 114. In some examples, the AME 102 also sets AME cookies in the client devices 108 to identify users that are enrolled in a panel of the AME 102 such that the AME 102 collects PII data of people that agree to having their internet activities monitored by the AME 102.

The impression requests 122a-c may be implemented using HTTP requests. However, whereas HTTP requests are network communications that traditionally identify web pages or other resources to be downloaded, the impression requests 122a-c of the illustrated example are network communications that include audience measurement information (e.g., ad campaign identification, content identifier, and/or user identification information) as their payloads. The server (e.g., the AME computer 110 and/or the database proprietor servers 118a-b) to which the impression requests 122a-c are directed is programmed to log occurrences of impressions reported by the impression requests 122a-c. Further examples of monitoring instructions (e.g., beacon instructions) and uses thereof to collect impression data are disclosed in Mazumdar et al., U.S. Pat. No. 8,370,489, entitled "Methods and Apparatus to Determine Impressions using Distributed Demographic Information," which is hereby incorporated herein by reference in its entirety.

In other examples in which the media 114 is accessed by apps on mobile devices, tablets, computers, etc. (e.g., that do not employ cookies and/or do not execute instructions in a web browser environment), an app publisher (e.g., an app store) can provide a data collector in an install package of an app for installation at the client devices 108. When a client device 108 downloads the app and consents to the accompanying data collector being installed at the client device 108 for purposes of audience/media/data analytics, the data collector can detect when the media 114 is accessed at the client device 108 and cause the client device 108 to send one or more of the impression requests 122a-c to report the access to the media 114. In such examples, the data collector can obtain user identifiers and/or device identifiers stored in the client devices 108 and send them in the impression requests 122a-c to enable the database proprietors 106a-b and/or the AME 102 to log impressions. Further examples of using a collector in client devices to collect impression data are disclosed in Burbank et al., U.S. Pat. No. 8,930,701, entitled "Methods and Apparatus to Collect Distributed User Information for Media Impressions and Search Terms," and in Bosworth et al., U.S. Pat. No. 9,237,138, entitled "Methods and Apparatus to Collect Distributed User Information for Media Impressions and Search Terms," both of which are hereby incorporated herein by reference in their entireties.

In some examples, the database proprietor servers 118a-b may additionally or alternatively use server logs to log impressions based on requests for media 114 from the client devices 108. For example, when a user of a client device 108 provides a URL or selects an item of media for viewing, the client device 108 sends an HTTP request (e.g., the impression request 122a-b) to a database proprietor server 118, a-b that includes the first-party cookie and an identifier of the requested media. In response, the database proprietor server 118a-b serves the requested media to the client device 108 and logs an impression of the media as attributable to the client device 108.

Typically, the database(s) 124a-b maintained by the database proprietors 106a-b are implemented in a closed platform or walled garden so that untrusted third parties do not have access to the information stored in the database. Among other reasons, database systems implemented in this manner serve to maintain the privacy of the users registered with the database proprietors 106a-b. Maintaining the privacy of individuals represented within the databases of the database proprietors 106a-b is in some tension with the interests of third-party entities (e.g., media providers that may want to target particular individuals (and/or particular demographic segments of a population) with media (e.g., advertisements)), and/or the AME 102 that may want to generate audience metrics (e.g., audience size) based on tracked exposures to the media 114).

In the illustrated example, the database proprietors 106a-b collaborate with the AME 102 so that the AME 102 can operate as an independent party that measures and/or verifies audience measurement information pertaining to the media 114 accessed by the subscribers of the database proprietors 106a-b. However, the database proprietors 106a-b desire to do so while protecting the privacies of their subscribers by not sharing or revealing subscriber identities, subscriber information, and/or any other subscriber PII data to outside parties. In examples disclosed herein, to share impression data with the AME 102 without revealing subscriber identities, subscriber information, and/or any other subscriber PII data, the database proprietors 106a-b process their collected impression data to generate corresponding sketch data 132a-b. In some examples, the sketch data 132a-b is generated by a database proprietor apparatus 700 implemented by the corresponding data base proprietor servers 118a-b. Further detail regarding the database proprietor apparatus 700 is provided below in connection with FIG. 7.

As used herein, sketch data is an arrangement of data for use in massive data analyses. For example, operations and/or queries that are specified with respect to the explicit and/or very large subsets, can be processed instead in sketch space (e.g., quickly (but approximately) from the much smaller sketches representing the actual data). This enables processing each observed item of data (e.g., each logged media impression and/or audience member) quickly in order to create a summary of the current state of the actual data. In some examples, summary statistics or sketch data provide an indication of certain characteristics (e.g., number of impressions of a media item and/or audience reach of the media item) of data in a database without disclosing any personally identifiable information of individual users that may have contributed to the summary statistics.

One type of data structure that is useful to provide summary statistics (e.g., sketch data) in the context of tracking exposure to media is the Bloom filter array. A typical Bloom filter array is a vector or array of bits that are initialized to 0 and then populated by flipping individual ones of the bits from 0 to 1 based on the allocation or assignment of users (or other data entries) in a database (e.g., the databases 124a-b of the database proprietors 106a-b of FIG. 1) to respective ones of the bits in the Bloom filter array. The users (or other data entries) in a database that are represented in the Bloom filter array are identified as corresponding to summary statistics of interest (e.g., users that were exposed to a particular media item, users that visited a particular website, etc.). That is, while it would be possible to generate a vector for sketch data of all subscribers of either one of the database proprietors 106a-b, in many instances, the subscribers included in particular sketch data 132a-b may be the subset of all subscribers that corresponds to audience members that accessed and/or were exposed to a particular media item 114 of interest and/or the subset of all subscribers identified based on any other suitable filter defined by one or more criteria.

Figure 2:
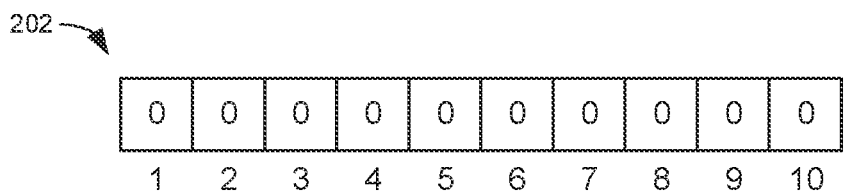
FIGS. 2-5 illustrate the creation of a traditional Bloom filter array.
Figure 3:
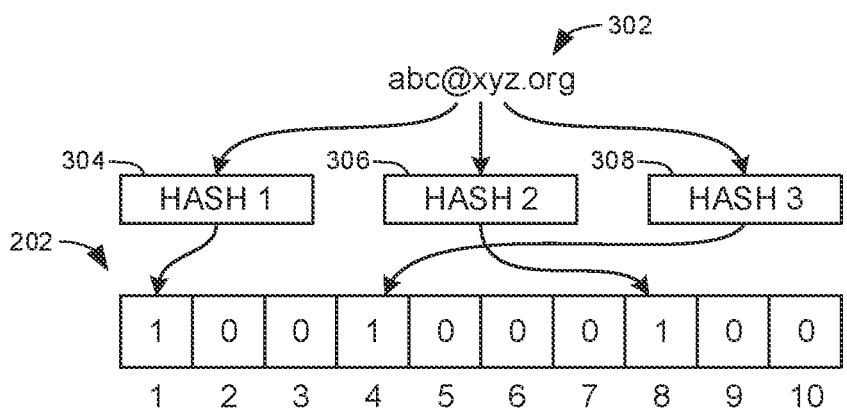
Figure 4:
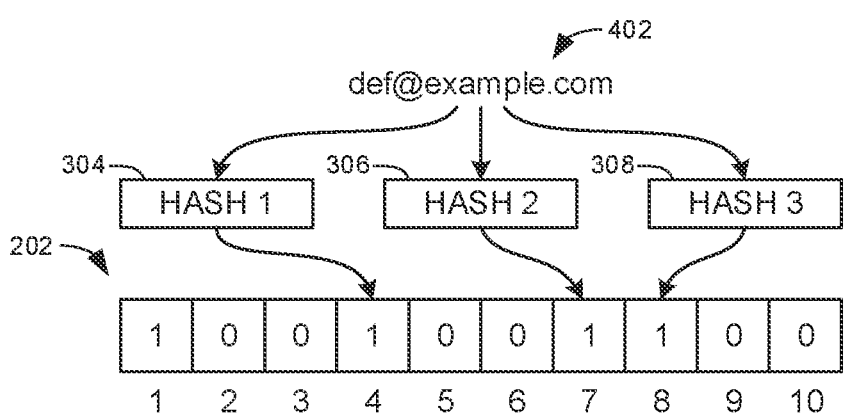
Figure 5:
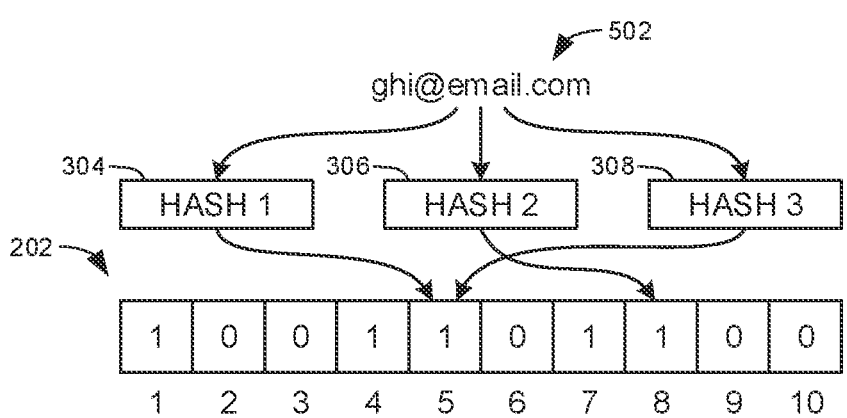

The process of generating a Bloom filter array representative of three distinct users is demonstrated in connection with FIGS. 2-5. FIG. 2 illustrates an initial Bloom filter array 202 that has a vector length of 10 bits with all values being initialized to 0. FIG. 3 illustrates the values of the elements in the Bloom filter array 202 after the mapping of a first user to the Bloom filter array 202. FIG. 4 illustrates the values of the elements in the Bloom filter array 202 after the mapping of a second user to the Bloom filter array 202. FIG. 5 illustrates the values of the elements in the Bloom filter array 202 after the mapping of a third user to the Bloom filter array 202. To populate the Bloom filter array, email addresses 302, 402, 502 of the respective first, second, and third users are used. While the email addresses 302, 402, 502 are represented in the figures, any type of PII data could additionally or alternatively be used. More generally, although the underlying dataset in the illustrated example represents different people (e.g., different users), the Bloom filter array may represent any type of dataset that includes different items with a unique identifier that can be processed by the hash function(s) to allocate the items to corresponding elements in the Bloom filter array.

As shown in FIGS. 3-5, three separate hash functions 304, 306, 308 are applied to each of the email addresses 302, 402, 502 and the particular bit or element in the Bloom filter array 202 to which the corresponding user is mapped is based on the output of the hash functions 304, 306, 308. The three hash functions 304, 306, 308 are shown for purposes of explanation but any number of hash functions may be used (e.g., only 1 hash function, 2 hash functions, more than 3 hash functions). In examples disclosed herein, each of the hash functions 304, 306, 308 is designed to map a particular input (e.g., a particular email address 302, 402, 502) to one and only one element in the Bloom filter array 202. Further, the hash functions 304, 306, 308 are designed such that the probability of a particular input being assigned to a given element in the Bloom filter array 202 is the same as the probability of being assigned to any other element in the Bloom filter array 202. That is, where the Bloom filter array 202 has a length of m (e.g., m=10 in the illustrated examples), the probability $p_i$ that a given input (e.g., a particular email address 302, 402, 502) is assigned to the ith element is $p_i=1/m$.

In some examples, for the sketch data 132a-b (e.g., the Bloom filter array 202) from the separate database proprietors 106a-b to be reliably aggregated and meaningfully analyzed, the particular hash function(s) (e.g., the hash functions 304, 306, 308) used by each database proprietors 106a-b need to be agreed upon in advance. Further, the length of the Bloom filter array 202 as generated by each of the database proprietors 106a-b needs to be the same. Based on these constraints, if a user is a registered subscriber of both database proprietors 106a-b and identified as an audience member of a particular media item 114, then both database proprietors 106a-b will include the user in their respective Bloom filter arrays (e.g., sketch data 132a-b) and the user will be allocated to the same elements in both Bloom filter arrays (e.g., based on the same output of the same hash function used by both database proprietors 106a-b). Inasmuch as hashing functions cannot be reversed, the PII data for the particular audience members is kept private, thereby preserving the anonymity of the underlying raw data represented by the sketch data 132a-b.

As represented in FIG. 3, the first email address 302 is allocated to the first element of the Bloom filter array 202 based on the first hash function 304, the eighth element of the Bloom filter array based on the second hash function 306, and the fourth element of the Bloom filter array 202 based on the third hash function. As such, the bit value of each of the first, fourth, and eighth elements in the Bloom filter array 202 are flipped from a 0 (as shown in FIG. 2) to a 1 (as shown in FIG. 3).

As represented in FIG. 4, the second email address 402 is allocated to each of the fourth, seventh, and eighth elements of the Bloom filter array 202 based on the respective outputs of the first, second, and third hash functions 304, 306, 308. As a result, the bit value of the seventh element in the Bloom filter array 202 is flipped from a 0 to a 1. Notably, however, there is no change in the bit values for the fourth and eighth elements in the Bloom filter array 202 because these bits were already changed to a value 1 based on the mapping of the first email address 302 to the same elements. In other words, a value of 0 in a particular element in a Bloom filter array 202 remains a 0 so long as no data entry (e.g., no user) is mapped to that particular element. However, once at least one user is mapped to a particular element the value of the element is flipped to a 1 and remains a 1 regardless of any further assignments of different users to the same element.

As represented in FIG. 5, the third email address 502 is allocated to the fifth element twice (based on each of the first and third hash functions 304, 308) and to the eighth element once (based on the second hash function 306). As a result, the value of the fifth element is flipped to a 1 (based on the output of the first hash function 304) and remains a 1 thereafter such that the duplicate allocation to that element (based on the output of the third hash function 308) has no effect. Further, as above, the allocation of the third email address 502 to the eighth element in the Bloom filter array 202 (based on the second hash function 306) has no effect on the corresponding bit value because the value was previously flipped to a 1.

The mapping of the output of multiple different hash functions (e.g., the first and third hash functions 304, 308) to the same element (e.g., the fifth element in FIG. 5) for a single user identifier (e.g., third email address 502) is referred to as a hash collision. There is always some probability that a hash collision may occur when multiple hash functions are used. However, the probability of a hash collision may be reduced by increasing the length of the Bloom filter array 202 (e.g., increasing the number of elements in the array to which a user may be allocated). In many applications, the number of elements in a Bloom filter array may number in the hundreds or even in the thousands such that hash collisions are relatively rare. Relatively long Bloom filter arrays also reduce the likelihood of the array becoming saturated. A Bloom filter array becomes saturated when an overly large proportion of the bits are flipped to a value of 1. As mentioned above, once a bit value is flipped to a 1 in a Bloom filter array, the value remains at a value of 1 thereafter. Thus, as the number of users to be represented in a Bloom filter array increases, there will be an ever increasing number of 1s until (theoretically) all 0s have become 1s. When a Bloom filter array is entirely filled with is (or has an overly large proportion of 1s) it is no longer possible to infer anything from the sketch data. Accordingly, Bloom filter arrays are designed with a sufficient length relative to an expected size of the database to be represented to reduce (e.g., avoid) saturation so that the resulting sketch data remains meaningful and valuable.

While longer Bloom filter arrays reduce the likelihood of hash collisions and reduce the likelihood of saturation occurring, longer Bloom filter arrays can increase memory requirements to store the arrays and reduce the computational efficiency with which the arrays may be analyzed. Furthermore, having Bloom filter arrays that are overly long presents concerns for user privacy. For instance, although the Bloom filter array 202 does not contain any personally identifiable information (PII) data (e.g., the email addresses 302, 402, 502), the flipping of bits from 0 to 1 is based on a hash of such PII data. As such, if a Bloom filter array is sparsely populated because of a relatively large number of elements to which each user may be allocated and/or a relatively small database represented in the Bloom filter array, it is possible that separate users will be mapped to separate elements in the Bloom filter array with no overlap. In such a situation, there may be a loss of privacy if a third-party entity has access to the Bloom filter array and has independent access to the email addresses 302, 402, 502 and knows the particular hash function(s) used to populate the Bloom filter array 202. In particular, the third party may be able to confirm whether or not a particular user was included in the sketch data represented by the Bloom filter array 202 by regenerating the hashes and mapping the outputs to the Bloom filter array 202 to see whether the corresponding elements have a bit value of 0 or 1. However, this privacy concern is somewhat mitigated for very large databases and/or Bloom filter arrays with short lengths because multiple user are more likely to map to the same element in the Bloom filter array 202. That is, a bit value of 1 in a particular element of the Bloom filter array 202 may correspond to multiple users in a database the Bloom filter array 202 is created to represent such that a third-party entity may only confirm whether it is possible that a particular user is included in the dataset underlying the Bloom filter array 202. Therefore, the length of a Bloom filter array is often defined based on a tradeoff between increasing user privacy (by reducing the vector length) and reducing saturation for more reliable statistics (by increasing the vector length). Notably, if a third-party entity determines that the output of a hash function for a particular user corresponds to an element in the Bloom filter array 202 that has a value of 0, the third-party entity can at least confidently confirm that the particular user is not included in the underlying dataset. Thus, while Bloom filters arrays can generate false positives when testing for dataset membership, false negatives are impossible (unless additional steps are taken to increase privacy by, for example, adding noise to the array).

Even though the membership of a particular user within a particular dataset represented by a Bloom filter array cannot be guaranteed with confidence, due to the nature in which users are allocated to different elements in the array, it is still possible to reliably estimate the cardinality or total number of unique users included in the underlying dataset. Furthermore, it is possible to reliably estimate the cardinality of users represented across multiple different Bloom filter arrays. To understand the process of estimating the cardinality of users represented in a Bloom filter array (or across multiple Bloom filter arrays), it is useful to consider the probabilities associated with randomly distributing balls into urns or bins.

In particular, allocating users uniformly across a discrete set of elements in a Bloom filter array of length m (as outlined above in connection with FIGS. 2-5) and testing whether a particular element ends up with a 0 (no user allocations) or a 1 (at least one user allocation) is directly analogous to randomly distributing balls into urns or bins and seeing if a particular urn is empty or not. There is a known theorem defining the probability of a particular number of balls ending up in a particular urn where n balls are distributed across m urns with each ball being equally likely to fall into any of the urns. Specifically, the theorem provides that if n, m→∞, with n m$^{-1}$→λ<∞, then the limit standardized distribution of $M_r$ is unit normal (where $M_r$ denotes the number of urns containing r balls after the distribution is completed), and $$Pr\left(\frac{M_r - E[M_r]}{\sqrt{\text{Var}[M_r]}} < x\right) \to \Phi(x) \quad \text{Eq. 1}$$

with $$\lim_{m \to \infty} \frac{E[M_r]}{m} = \frac{\lambda^r}{r!} e^{-\lambda} \quad \text{Eq. 2}$$

$$\lim_{m \to \infty} \frac{\text{Var}[M_r]}{E[M_r]} = 1 - \frac{\lambda^r e^{-\lambda}}{r!}\left(1 + \lambda^{-1}(r - \lambda)^2\right)$$

Estimating the number of empty urns (e.g., r=0) is directly analogous to estimating the number of 0s in a Bloom filter array. When r=0, the above formulae simplify to $$\lim_{m \to \infty} \frac{E[M_0]}{m} = e^{-\lambda} \quad \text{Eq. 3}$$

$$\lim_{m \to \infty} \frac{\text{Var}[M_0]}{E[M_r]} = 1 - e^{-\lambda}(1 + \lambda)$$

yielding reliable approximations (in the limit) of the expectation and variance of the number of empty urns (or the number of 0s in a Bloom filter array), which may be expressed as follows:

$$E[M_0] \sim m e^{-\lambda}$$

$$\text{Var}[M_0] \sim m e^{-\lambda}(1 - e^{-\lambda}(1+\lambda)) \quad \text{Eq. 4}$$

Although λ in the above theorem is defined as a limiting ratio, if the limit is treated as an equality (e.g., λ=n/m) and the expected limiting value as an equality, then the value of n (the number of balls distributed into urns, which is analogous to the cardinality of users represented in a Bloom filter array) can be estimated using the observed count of $M_0$ as an estimate of $E[M_0]$ as follows:

$$\hat{n} = -m \log\left(\frac{M_0}{m}\right) \quad \text{Eq. 5}$$

where the circumflex accent on the $\hat{n}$ is to indicate an estimate rather than the actual value of n.

Inasmuch as $M_0$ is a random variable, $\hat{n}$ is also a random variable. Generally speaking, the expected value and variance of a function $f$ of a random variable X (having a mean $\mu_X$ and variance $\sigma_X^2$), can be approximated using Taylor expansions, provided that $f$ is sufficiently differentiable and that the moments of X are finite. The estimates for the expected value and variance may be expressed mathematically as follows:

$$E[f(X)] \approx f(\mu_X) + \frac{f''(\mu_X)}{2}\sigma_X^2 \quad \text{Eq. 6}$$

$$\text{Var}[f(X)] \approx (f'(E[X]))^2 \text{var}\{X\} = (f'(\mu_X))^2 \sigma_X^2$$

The above theorem can be applied to estimate the expected value and variance of the cardinality $\hat{n}$ in which case $X=M_0$ and $f(X)$ is defined as $$f(X) = -m \log\left(\frac{X}{m}\right) \quad \text{Eq. 7}$$

Specifically, inserting Equation 7 into the theorem defined in Equation 6 and simplifying yields $$E[\hat{n}] \approx n + \frac{1}{2}(e^{\lambda} - \lambda - 1)$$

$$\text{Var}[\hat{n}] \approx m(e^{\lambda} - \lambda - 1) \quad \text{Eq. 8}$$

Equation 8 shows that the formula for the estimate of n is almost unbiased because the second expression is $O(\lambda^2)$ by series expansion, with λ=n/m.

Applied to cardinality estimations, the above equations assume that each user is represented only once in a Bloom filter array (e.g., each user was allocated using only one hash function). If multiple hash functions are used to allocate users, the user will be represented the same number of times in the Bloom filter array. In such situations, n in the above equations is a multiple of another number, n=kn', where k is the number of hash functions and n' is the actual number of items allocated to the Bloom filter array (e.g., the unique audience size of users represented in the array). To estimate n', Equation 7 can be updated to divide by k, yielding the function $$f(X) = -\left(\frac{m}{k}\right)\log\left(\frac{X}{m}\right) \quad \text{Eq. 9}$$

which is an estimator of n'

$$\hat{n}' = -\left(\frac{m}{k}\right)\log\left(\frac{X}{m}\right) \quad \text{Eq. 10}$$

with expected value and variance of $$E[\hat{n}'] \approx n' + \frac{1}{2k}(e^{\lambda} - \lambda - 1) \quad \text{Eq. 11}$$

$$\text{Var}[\hat{n}'] \approx \frac{m}{k^2}(e^{\lambda} - \lambda - 1)$$

where λ=kn'/m and the term inside the parenthesis of the expected value is $O(\lambda^2)$.

Notably, the estimation defined in Equation 10 is based on defining the random variable X as corresponding to the number of elements in a Bloom filter array with a 0 after all allocations (e.g., the number of elements that were not allocated any users). The estimation could alternatively be implemented by defining the random variable X as corresponding to the number of elements in the Bloom filter array with a value of 1 (e.g., indicating at least one user was allocated to the element). In particular, if $X_0$ is the number of elements with a value of 0 and $X_1 = m - X_0$, the estimation can be rewritten as follows:

$$\hat{n}' = -\left(\frac{m}{k}\right)\log\left(1 - \frac{X_1}{m}\right) \quad \text{Eq. 12}$$

While Equation 12 could be used to estimate the cardinality of a Bloom filter array, examples disclosed herein are specifically described with respect to the estimation for n' as defined in Equation 10.

The bias term $$\frac{1}{2k}(e^\lambda - \lambda - 1)$$

in Equation 11 can be rewritten with the portion inside the parenthesis as $e^\lambda - (1+\lambda)$, which is identical in form to the error term between the function $e^\lambda$ and its Taylor series expansion up to the linear term. The bounds of such an expression is given by the Lagrange remainder theorem, which states that given a Taylor series $$f(x) = f(x_0) + \frac{f'(x_0)}{1!}(x - x_0) + \qquad \text{Eq. 13}$$
$$\frac{f''(x_0)}{2!}(x - x_0)^2 + \ldots + \frac{f^{(n)}(x_0)}{n!}(x - x_0)^n + R_n$$

the error $R_n$ after n terms can be rewritten using the mean-value theorem as $$R_n = \frac{f^{(n+1)}(x')}{(n+1)!}(x - x_0)^{n+1} \qquad \text{Eq. 14}$$

for some $x' \in \{x_0, x\}$.

Applying $f(\lambda) = e^\lambda$ and taking the series about $\lambda_0 = 0$ with $n=1$ and keeping the remainder on the right hand side yields $$e^\lambda - (1 + \lambda) = \frac{\lambda^2}{2}e^{\lambda'} \text{ for some } \lambda' \in \{0, \lambda\} \qquad \text{Eq. 15}$$

Although $\lambda'$ is unknown, the right hand side of Equation 15 is monotonically increasing with $\lambda'$ such that the error term reaches a maximum when $\lambda' = \lambda$. This demonstrates that the bias for $\hat{n}'$ is bounded from above by some value and bounded from below at zero because all terms within the bias expression are positive.

$$0 \le E[\hat{n}'] - n' \le \left(\frac{\lambda^2}{4k}\right)e^\lambda \qquad \text{Eq. 16}$$

Likewise, if the bounded criteria determined above that $$e^\lambda - \lambda - 1 \le \frac{\lambda^2}{2}e^\lambda \qquad \text{Eq. 17}$$

is used, the expression for the variance is also bounded from above $$\text{Var}[\hat{n}'] \le \frac{m}{k^2}\left(\frac{\lambda^2}{2}e^\lambda\right) \qquad \text{Eq. 18}$$

Unless extreme values for $\lambda$ are used, the expected value of a cardinality estimate can be assumed to be unbiased because any bias will be negligible. For example, assume that k=4 hash functions are used to allocate n'=10,000 users across a Bloom filter array having a length of m=20,000. Thus, in this example, $\lambda = kn'/m = 2$ and the maximum absolute bias in the cardinality estimate of $\hat{n}'$ is 1.85 out of the true cardinality of n'=10,000. This yields a maximum relative bias of only 0.2%. Although there is some bias, the maximum is small enough to be negligible for all intents and purposes such that the methodology can be used as if unbiased. As a result, it is possible to define a length m for a Bloom filter array that can satisfy an estimate for the cardinality of users represented by the Bloom filter array for a given confidence level and relative error. More particularly, let the relative error be r and the confidence level be defined as 1−α. Achieving a particular confidence interval requires $$Pr((1-r)n' \le \hat{n}' \le (1+r)n') \ge 1 - \alpha \qquad \text{Eq. 19}$$

which is equivalent to $$\frac{n'}{\sqrt{\text{Var}[\hat{n}']}} \ge \frac{z}{r} \qquad \text{Eq. 20}$$

where z is the two-sided z-score for the 1−α confidence level (e.g., z=1.96 for 1−α=0.95). Depending on criteria to be satisfied and variables to be solved, Equation 20 gives the inequality for which $\hat{n}'$ can be estimated with a specified confidence and relative error.

As a specific example, assume that the true cardinality of n'=10,000 allocated to a Bloom filter array using k=4 hash functions needs to be estimated with 95% confidence (e.g., z=1.96) with a relative error of +/−5%. In this example, the question is what is the minimum length m for the Bloom filter, to satisfy these conditions? Inasmuch as $\lambda$ is a function of m, the expression $$\frac{n'}{\sqrt{\frac{m}{k^2}(e^\lambda - \lambda - 1)}} \ge \frac{z}{r} \text{ with } \lambda = \frac{kn'}{m} \qquad \text{Eq. 21}$$

must be solved numerically. In this example, the solution is m≥8,177. Thus, a Bloom filter array that would enable the 95% confidence for estimating a cardinality with a relative error of +/−5%, where the true cardinality was 10,000, needs to have at least 8,177 elements. As mentioned above, there is often a tradeoff between having a longer Bloom filter array (to increase user privacy) and having a shorter Bloom filter array (to reduce saturation for more reliable statistics while also reducing memory space requirements). As outlined above, determining the particular length to use when striking a balance between these tradeoffs be facilitated by calculating minimum array lengths needed for particular relative errors at particular confidence intervals.

Often, the particular length of a Bloom filter array is specified in advance. Accordingly, in some examples, the reverse calculations can be made to determine the limits of inference possible using the specified length of array. For example, assume the Bloom filter array is fixed at length m=10,000 and k=4 hash functions are used. The question becomes what is the maximum value for the cardinality estimation of $\hat{n}'$ that would still fall within a 95% confidence interval (e.g., z=1.96) with a relative error of +/−5%? To answer this question, Equation 20 needs to be numerically solved for n'. In this example, the solution is n'≤13,019.

Thus, as long as there are no more than 13,019 users being allocated to the Bloom filter array (using k=4 hashes each), the array length of m=10,000 is sufficient to satisfy the 95% confidence with +/−5% relative error.

As mentioned above, allocating users uniformly across a discrete set of elements in a Bloom filter array of length m (as outlined above in connection with FIGS. 2-5) and testing whether a particular element ends up with a 0 (no user allocations) or a 1 (at least one user allocation) is directly analogous to randomly distributing balls into urns and seeing if a particular urn is empty or not. Particularly, the cardinality of a Bloom filter array can be estimated based on the number of elements in the array having a value of 0 (Equation 10) or a value of 1 (Equation 12). Equation 10 is reproduced below in Equation 22 except that a subscript for the random variable X has been added to clarify the estimation is based on the number of elements having a value of 0.

$$\hat{n}' = -\left(\frac{m}{k}\right)\log\left(\frac{X_0}{m}\right) \qquad \text{Eq. 22}$$

where n' is the estimate of the number of items in the Bloom filter array (e.g., the cardinality), m is the length (e.g., size) of the array, and k is the number of hash functions used to allocation each item in the array.

For two Bloom filter arrays (A, B) of length m, an estimate of their respective cardinalities or number of elements n(x) for Bloom filter array x, can be estimated as $$n(A') = -\left(\frac{m}{k}\right)\log\left(1 - \frac{c(A)}{m}\right) \qquad \text{Eq. 23}$$

and $$n(B') = -\left(\frac{m}{k}\right)\log\left(1 - \frac{c(B)}{m}\right) \qquad \text{Eq. 24}$$

where c(A) and c(B) are counts of the number of elements set to 1 in the two respective Bloom filter arrays. Further, the size or cardinality of the union of the two Bloom filter arrays can be estimated as $$n(A' \cup B') = -\left(\frac{m}{k}\right)\ln\left[1 - \frac{c(A \cup B)}{m}\right] \qquad \text{Eq. 25}$$

where c(A∪B) is a count of the number of elements set to 1 in a bitwise union of the two Bloom filter arrays. That is, c(A∪B) is a count of the number of elements at different indices of the Bloom filter arrays in which the corresponding element of at least one of the arrays is set to 1. Finally, the intersection of the two arrays (e.g., corresponding to the number of unique users represented in both arrays) can be estimated using the inclusion-exclusion principle by summing the cardinalities of each array individually (defined in Equations 23 and 24) and subtracting the cardinality of the union of the arrays (defined in Equation 25):

$$n(A' \cap B') = n(A') + n(B') - n(A' \cup B') \qquad \text{Eq. 26}$$

By defining $c_0(A)$, $c_0(B)$, and $c_0(A \cup B)$ as the number of elements set to 0 (rather than 1 as outlined above), Equations 23-25 can be simplified as follows:

$$n(A') = -\left(\frac{m}{k}\right)\ln\left[\frac{c_0(A)}{m}\right] \qquad \text{Eq. 27}$$

$$n(B') = -\left(\frac{m}{k}\right)\ln\left[\frac{c_0(B)}{m}\right] \qquad \text{Eq. 28}$$

$$n(A' \cup B') = -\left(\frac{m}{k}\right)\ln\left[\frac{c_0(A \cup B)}{m}\right] \qquad \text{Eq. 29}$$

As can be seen, the argument within the logarithm corresponds to a ratio of the count of 0s in the array(s) to the length m of the arrays. Further, based on the property of logarithms that log(a)+log(b)=log(ab) and that log(a)−log(b)=log(a/b), the individual ratios in the separate expressions of Equations 27-29 can be combined into a single argument for the intersection defined in Equation 26 that simplifies to:

$$n(A' \cap B') = -\left(\frac{m}{k}\right)\ln\left[\frac{c_0(A)c_0(B)}{mc_0(A \cup B)}\right] \qquad \text{Eq. 30}$$

In particular, as can be seen in Equation 30, the individual ratios in the logarithms of Equations 27-29 that correspond to cardinalities added in the inclusion-exclusion expression of Equation 26 are directly incorporated (by multiplication) into the logarithm argument in Equation 30. By contrast, for cardinalities subtracted in the inclusion-exclusion expression of Equation 26, the inverse of the ratio in the corresponding logarithms of Equations 27-29 is included into the logarithm argument in Equation 30. Stated another way, the ratio is divided instead of multiplied when incorporated into the logarithm argument of Equation 30. It is because the ratio associated with Equation 29 is inverted when included in Equation 30 that the additional m terms cancel leaving only one m in the denominator.

As the union operation on Bloom filter arrays is lossless in the sense that the resulting Bloom filter array is the same as the Bloom filter array generated from scratch using the union of the two sets. Therefore, by associativity and induction the union operation on Bloom filter arrays is lossless for any number of unions. As a result, the same formula for estimating cardinality for a single Bloom filter array can be applied to a Bloom filter array generated based on the union of two or more underlying Bloom filter arrays. That is, the estimation for the cardinality of the union of three Bloom filter arrays can be expressed as $$n(A' \cup B' \cup C') = -\left(\frac{m}{k}\right)\ln\left[\frac{c_0(A \cup B \cup C)}{m}\right] \qquad \text{Eq. 31}$$

An estimation for the union of any number of Bloom filter arrays may be similarly defined. Further, by the properties of logarithms noted above and by the inclusion-exclusion principle, it can be seen that any cardinality estimate of an unconditional union or intersection can be expressed as $$n(X) = -\left(\frac{m}{k}\right)\ln\left[f\left(\{c_{i_1 i_2 \ldots}\}\right)\right] \qquad \text{Eq. 32}$$

where X represents any cardinality of interest, and $f(\{c_{i_1 i_2}, \ldots\})$ is a function of counts of 0, as pairs, triplets, etc. across the Bloom filter arrays. For instance, if there are three Bloom filter arrays to be analyzed, any unconditional cardinality can be estimated as a function of the set $$\{c_1, c_2, c_3, c_{12}, c_{13}, c_{23}, c_{123}\} \qquad \text{Eq. 33}$$

where $c_{i_1 i_2}$... is the number of tuples in which all array elements corresponding to the same indices are set to 0 (e.g., the number of elements in a bitwise union of the relevant arrays that are set to 0). For example, $c_{13}$ is the number of pairs across the first and third Bloom filter arrays for which both have a value of 0.

Stated differently, any unconditional union or intersection of data (e.g., users or subscribers) represented in multiple Bloom filter arrays can be defined by a particular combination or set of mutually exclusive disjoint datasets associated with the data represented in the Bloom filter arrays. For three Bloom filter arrays (representative of three sets of users), there are seven mutually exclusive disjoint datasets. These are represented in the example Venn diagram 600 shown in FIG. 6. As shown in the illustrated example, the data represented by three Bloom filter arrays 602, 604, 606 is represented by three circles labelled A, B, and C. As shown in the illustrated example, the first disjoint dataset 608 corresponds to users represented only in the first Bloom filter array 602 (and not in the other two arrays 604, 606); the second disjoint dataset 610 corresponds to users represented only in the second Bloom filter array 604 (and not in the other two arrays 602, 606); and the third disjoint dataset 612 corresponds to users represented only in the first Bloom filter array 602 (and not in the other two arrays 602, 604). Further, the fourth disjoint dataset 614 corresponds to users represented in the first and second Bloom filter arrays 602, 604 but not the third array 606; the fifth disjoint dataset 616 corresponds to users represented in the first and third Bloom filter arrays 602, 606 but not the second array 604; and the sixth disjoint dataset 618 corresponds to users represented in the second and third Bloom filter arrays 604, 606 but not the first array 602. Finally, the seventh disjoint dataset 620 corresponds to users represented in all three Bloom filter arrays 602, 604, 606.

By defining each of the mutually exclusive disjoint datasets 608, 610, 612, 614, 616, 618, 620, any combination of unions and/or intersections can be specified. For example, the union of the first two Bloom filter arrays 602, 604 corresponds to the first, second, fourth, fifth, sixth and seventh disjoint datasets 608, 610, 614, 616, 618, 620 (e.g., all but the third disjoint dataset 612). As another example, the intersection of the first two Bloom filter arrays 602, 604 corresponds to the fourth and seventh disjoint datasets 614, 620. Other combinations not specifically a union or intersection may also be identified. For instance, a particular grouping of users of interest may be those users that in either the first Bloom filter array 602 or the second Bloom filter array 604, but not the third Bloom filter array. Such a grouping of users corresponds to the first, second, and fourth disjoint datasets 608, 610, 614.

The cardinality or audience size of any one of the above example user groups and/or any other combination of the disjoint datasets can be estimated as a function of the set of counts noted in Equation 33. Furthermore, any combination of disjoint datasets for any other number of Bloom filter arrays (e.g., 4, 5, 6, etc.) may also be identified to define a particular user group of interest and the cardinality of the user group can be estimated based on a function of counts of 0s in the corresponding Bloom filter arrays.

Figure 6:
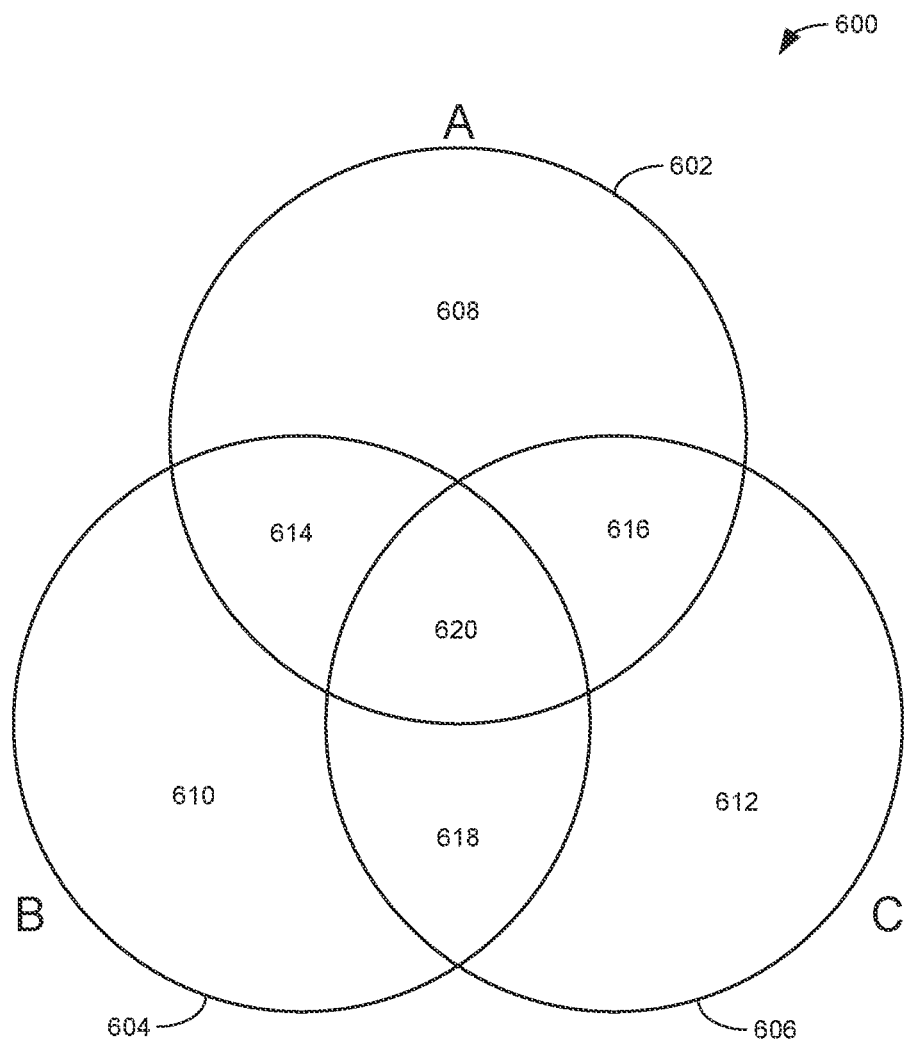
FIG. 6 illustrates an example Venn diagram showing the various disjoint datasets possible across three sets of data represented by three different Bloom filter arrays.

To generalize the notation, instead of using {A, B, C, . . . } for different Bloom filters, let s be the number of Bloom filter arrays, $c_{i_1 i_2}$... be the number of tuples in which the elements of all relevant arrays at corresponding indices are set to 0 (as defined above), $A_{i_1 i_2}$... be the cardinality of the intersection of arrays given by $\{i_1, i_2, \ldots\}$ (e.g., $A_{12}$ is the number of unique users represented in both the first array and the second array), $A^{i_1 i_2}$... be the cardinality of the union of arrays given by $\{i_1, i_2, \ldots\}$ (e.g., $A^{12}$ is the number of users represented in either the first array or the second array or both the first and second arrays), and $n_{b_1 b_2} \ldots b_s$ where $b_i \in \{0,1\}$ is the disjoint set across the s Bloom filter arrays of the number of users that truly belong to Boolean values of 1 within the indices (e.g., $n_{101}$ is the number of users represented in both the first and third arrays, only, and not in the second array (e.g., the fifth disjoint dataset 616 in the illustrated example of FIG. 6). Based on the above notational definitions, Equations 27-29 can be rewritten, respectively, as follows:

$$\widehat{A^1} = -\left(\frac{m}{k}\right)\ln\left[\frac{c_1}{m}\right] \qquad \text{Eq. 34}$$

$$\widehat{A^2} = -\left(\frac{m}{k}\right)\ln\left[\frac{c_2}{m}\right] \qquad \text{Eq. 35}$$

$$\widehat{A^{12}} = -\left(\frac{m}{k}\right)\ln\left[\frac{c_{12}}{m}\right] \qquad \text{Eq. 36}$$

Similarly, the intersection defined in Equation 30 can be rewritten as follows:

$$\widehat{A_{12}} = \widehat{A^1} + \widehat{A^2} - \widehat{A^{12}} = -\left(\frac{m}{k}\right)\ln\left[\frac{c_1 c_2}{mc_{12}}\right] \qquad \text{Eq. 37}$$

The above notation can be used to define the cardinality estimates for any union and any intersection across any number of Bloom filter arrays. For instance, in the example of three Bloom filter arrays, the disjoint mutually exclusive cardinalities $(n_{b_1 b_2} \ldots b_s)$ (e.g., corresponding to the disjoint datasets 608, 610, 612, 614, 616, 618, 620 of FIG. 6) can be used to define the following identities for each different union:

$A^1 = n_{100} + n_{101} + n_{110} + n_{111}$ $A^2 = n_{010} + n_{011} + n_{110} + n_{111}$ $A^3 = n_{001} + n_{011} + n_{101} + n_{111}$ $A^{12} = n_{010} + n_{011} + n_{100} + n_{101} + n_{110} + n_{111}$ $A^{13} = n_{001} + n_{011} + n_{100} + n_{101} + n_{110} + n_{111}$ $A^{23} = n_{001} + n_{010} + n_{011} + n_{101} + n_{110} + n_{111}$ $A^{123} = n_{001} + n_{010} + n_{011} + n_{100} + n_{101} + n_{110} + n_{111} \qquad \text{Eq. 38}$ Similarly, the disjoint mutually exclusive cardinalities $(n_{b_1 b_2} \ldots b_s)$ can be used to define the following identities for each different intersection:

$A_1 = n_{100} + n_{101} + n_{110} + n_{111}$ $A_2 = n_{010} + n_{011} + n_{110} + n_{111}$ $A_3 = n_{001} + n_{011} + n_{101} + n_{111}$ $A_{12} = n_{110} + n_{111}$ $A_{13} = n_{101} + n_{111}$ $A_{23} = n_{011} + n_{111}$ $A_{123} = n_{111} \qquad \text{Eq. 39}$ As can be seen with reference to Equations 38 and 39, the union $A^j$ is equal to the intersection $A_j$, which corresponds to the cardinality of the j dataset. Also, $A^{123}$ represents the total union across all datasets (for s=3), whereas $A_{123}$ represents the cardinality of the users who belong to all datasets together (e.g., the cardinality of users in the seventh disjoint dataset 620 of FIG. 6).

Equations 38 and 39 can be inverted inasmuch as the sets {A} and {n} are linear and full rank. Thus, given any expression using one notation, an equivalent expression can be given in the other notation. The linear transformation from the union sets $\{A^j\}$ to the disjoint cardinality set {n} is as follows:

$n_{001} = A^{123} - A^{12}$ $n_{010} = A^{123} - A^{13}$ $n_{011} = A^{12} + A^{13} - A^{123} - A^1$ $n_{100} = A^{123} - A^{23}$ $n_{101} = A^{12} + A^{23} - A^{123} - A^2$ $n_{110} = A^{13} + A^{23} - A^{123} - A^3$ $n_{111} = A^1 + A^2 + A^3 - A^{12} - A^{13} - A^{23} + A^{123}$  Eq. 40

Similarly, the linear transformation from the intersection sets $\{A_j\}$ to the disjoint cardinality set {n} is as follows:

$n_{001} = A_3 - A_{13} - A_{23} + A_{123}$ $n_{010} = A_2 - A_{11} - A_{23} + A_{123}$ $n_{011} = A_{23} - A_{123}$ $n_{100} = A_1 - A_{12} - A_{13} + A_{123}$ $n_{101} = A_{13} - A_{123}$ $n_{110} = A_{12} - A_{123}$ $n_{111} = A_{123}$  Eq. 41

The set {n} as a function of union cardinalities can be substituted into the definition of intersection cardinalities and algebraically simplified to define the intersection cardinalities as a function of the union cardinalities alone:

$A_1 = A^1$ $A_2 = A^2$ $A_3 = A^3$ $A_{12} = A^1 + A^2 - A^{12}$ $A_{13} = A^1 + A^3 - A^{13}$ $A_{23} = A^2 + A^3 - A^{23}$ $A_{123} = A^1 + A^2 + A^3 - A^{12} - A^{13} - A^{23} + A^{123}$  Eq. 42

The relationships set forth in Equation 42 are also true in general (e.g., for any number of Bloom array filters) based on the principle of inclusion-exclusion. That is, any intersection and/or any combination of disjoint sets associated with any number of Bloom filter arrays can be defined by an inclusion-exclusion expression that adds (includes) and subtracts (excludes) different cardinalities of unions of the Bloom filter arrays (and/or the cardinalities of individual arrays by themselves).

Inasmuch as the estimation for any particular union cardinality can be computed, as outlined above, it is possible to calculate the cardinality associated with any combination of unions, intersections, and/or more generally, any combination of disjoint datasets associated with any number of Bloom filter arrays. For instance, $$\widehat{A^{13}} = \widehat{A^1} + \widehat{A^3} - \widehat{A^{13}} = -\left(\frac{m}{k}\right)\ln\left[\frac{c_1 c_3}{mc_{13}}\right]$$  Eq. 43

Likewise, $$\widehat{n_{011}} = \widehat{A^{12}} + \widehat{A^{13}} - \widehat{A^{123}} - \widehat{A^1} = -\left(\frac{m}{k}\right)\ln\left[\frac{c_{12} c_{13}}{mc_1 c_{13}}\right]$$  Eq. 44

Further, an example set of multiple disjoint cardinalities of interest may be the cardinality of all users represents in one and only one Bloom filter array, which may be estimated as follows:

$$\widehat{n_{100}} + \widehat{n_{010}} + \widehat{n_{001}} = 3\widehat{A^{123}} - \widehat{A^{12}} - \widehat{A^{13}} - \widehat{A^{23}} = -\left(\frac{m}{k}\right)\ln\left[\frac{c_{123}^3}{c_{12} c_{13} c_{23}}\right]$$  Eq. 45

The rule defining the cardinality estimates shown by way of example in Equations 43-45 is general by nature. Specifically, the coefficients $A^{\{x\}}$ for arbitrary {x} is the power of $c_{\{x\}}/m$ within the logarithm. Thus, if the coefficient $A^{\{x\}}$ is added in the inclusion-exclusion expression (e.g., right hand side of first line of Equation 45), the logarithm argument (e.g., in the second line of Equation 45) includes the ratio of $c_{\{x\}}/m$, whereas if the coefficient $A^{\{x\}}$ is subtracted in the inclusion-exclusion expression the inverse of the ratio is included. Further, when a constant in front of the coefficient $A^{\{x\}}$ is other than one, the ratio (or its inverse) includes an exponent to the power of the constant. In most cases, there is a normalization m that remains. However, in some instances, as represented in Equation 45, the normalization cancels out based on the number of ratios and inverse ratios included in the logarithm argument.

While the above equations define the relationships for three Bloom filter arrays, the equations may be generalized for any number of Bloom array filters. Let $M^{\{1\}}$ be the matrix that transforms the disjoint sets into union cardinalities:

$[A^\cdot] = [M^{\{1\}}][n_\cdot]$  Eq. 46 where the bullet symbol (•) represents the entire collection of sets across all Bloom filter arrays (e.g., for 3 arrays the vector of n, would be a column vector of length 7 corresponding to the seven disjoint datasets 608, 610, 612, 614, 616, 618, 620 represented in FIG. 6). Likewise, let $M_{\{1\}}$ be similarly defined for the intersections:

$[A_\cdot] = [M_{\{1\}}][n_\cdot]$  Eq. 47

The matrices defined in Equations 46 and 47 are relatively easy to construct, even for a relatively large number of Bloom filter arrays.

Let F be defined as a row vector that yields a linear combination of a column vector. More particularly, F is a row vector that identifies the particular combination of the disjoint sets in the column vector n, that correspond to the particular user group of interest for which the cardinality or audience size is to be estimated. As estimates of $A^\cdot$ are known for Bloom filter arrays (based on the equations outlined above), all expressions are defined in terms of A˙ on the right hand side. Thus, for example, Equation 46 may be rewritten as $$[n_\bullet] = [M^{(1)}]^{-1}[A_\bullet] \qquad \text{Eq. 48}$$

and which can be modified with a linear combination:

$$[F][n_\bullet] = [F][M^{(1)}]^{-1}[A_\bullet] \qquad \text{Eq. 49}$$

Additionally or alternatively, the intersections can be solved for and defined with respect to A˙:

$$[A_\bullet] = [M_1][n_\bullet] = [M_{(1)}][M^{(1)}]^{-1}[A^\bullet] \qquad \text{Eq. 50}$$

Further, the intersections can also be modified with a linear combination:

$$[F][A_\bullet] = [F][M_1][n_\bullet] = [F][M_{(1)}][M^{(1)}]^{-1}[A^\bullet] \qquad \text{Eq. 51}$$

As noted above, for any linear expression, the coefficients $A^{\{x\}}$ for arbitrary $\{x\}$ is the power of $c_{\{x\}}/m$ within the logarithm. This is algebraically equal to evaluating the estimate for all terms and possibly using complicated inclusion-exclusion expressions to provide the linear expressions individually.

Figure 7:
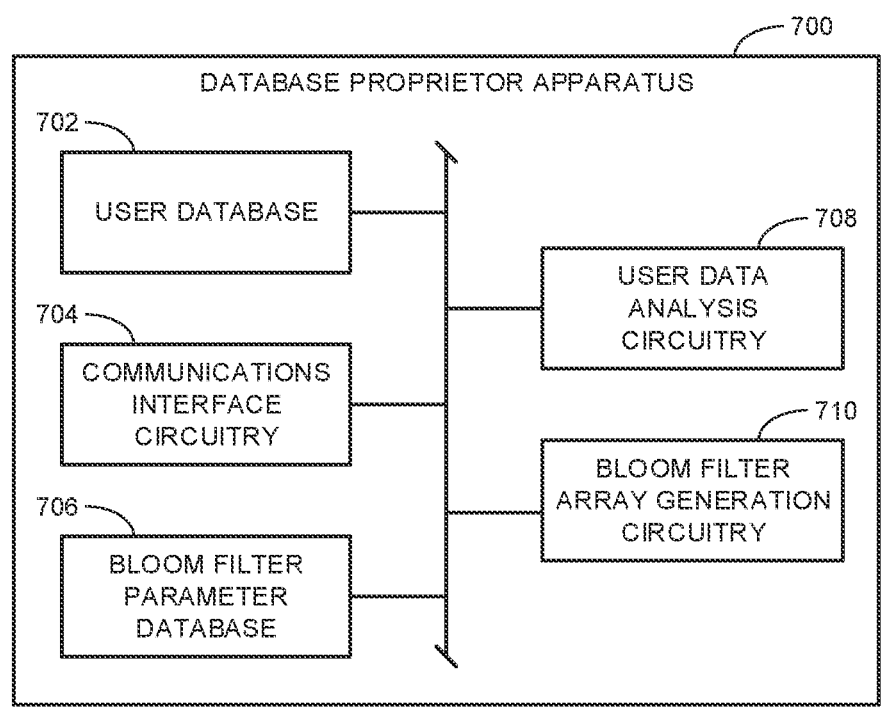
FIG. 7 is a block diagram of the example database proprietor apparatus of any one of the example database proprietors of FIG. 1.

FIG. 7 is a block diagram of an example database proprietor apparatus 700. The example database proprietor apparatus 700 of FIG. 7 may correspond to any one of the database proprietors 106a-b of FIG. 1. As shown in the illustrated example, the database proprietor apparatus 700 includes an example user database 702, an example communications interface circuitry 704, an example Bloom filter parameter database 706, an example user data analysis circuitry 708, and an example Bloom filter array generation circuitry 710.

The example user database 702 stores user data associated with users (e.g., subscribers) registered with the database proprietor apparatus 700. In some examples, the user data includes a user identifier corresponding to any suitable PII. The example communications interface circuitry 704 enables the database proprietor apparatus 700 to communicate with the AME 102.

The example Bloom filter parameter database 706 stores the Bloom filter parameters used to define and/or generate one or more Bloom filter arrays representative of the users in the user database 702. In some examples, some or all of the Bloom filter parameters are determined and/or received from the AME 102 (e.g., via the communications interface circuitry 704). In some examples, some or all of the Bloom filter parameters are determined by one or more database proprietors 106a-b. In some examples, the Bloom filter parameters include one or more of a length (e.g., number of bits or elements) in the Bloom filter array, the identification of one or more hash function(s) used to map users to different elements of the Bloom filter array, and/or the distribution of outputs of the hash function(s) across the different bits of the Bloom filter array and the corresponding mapping of hash function outputs to the different elements in the array (e.g., parameters defining the number of different hash function outputs that map to each element and the particular outputs that map to each particular element). Regardless of how the Bloom filter parameters are set or determined (e.g., whether by the AME 102 and/or the database proprietors 106a-b), the Bloom filter array length, hash function(s), and corresponding hash function output mapping are to be agreed upon by all database proprietors 106a-b.

The example user data analysis circuitry 708 analyzes user data in the user database 702 to identify users that accessed media for which the AME 102 is interested in generating audience measurement metrics. The example Bloom filter array generation circuitry 710 generates Bloom filter arrays based on the Bloom filter parameters and the user information associated with users identified by the user data analysis circuitry 708 to be included in the array. In some examples, the users to be included in the Bloom filter array are identified based on whether the users were exposed to media being tracked by the AME 102. An example process to generate a Bloom filter array in accordance with teachings disclosed herein is detailed below in connection with FIG. 9.

While an example manner of implementing the database proprietor apparatus 700 of FIG. 1 is illustrated in FIG. 7, one or more of the elements, processes and/or devices illustrated in FIG. 7 may be combined, divided, re-arranged, omitted, eliminated and/or implemented in any other way. Further, the example user database 702, the example communications interface circuitry 704, the example Bloom filter parameter database 706, the example user data analysis circuitry 708, the example Bloom filter array generation circuitry 710 and/or, more generally, the example database proprietor apparatus 700 of FIG. 7 may be implemented by hardware, software, firmware and/or any combination of hardware, software and/or firmware. Thus, for example, any of the example user database 702, the example communications interface circuitry 704, the example Bloom filter parameter database 706, the example user data analysis circuitry 708, the example Bloom filter array generation circuitry 710 and/or, more generally, the example database proprietor apparatus 700 could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example user database 702, the example communications interface circuitry 704, the example Bloom filter parameter database 706, the example user data analysis circuitry 708, and/or the example Bloom filter array generation circuitry 710 is/are hereby expressly defined to include a non-transitory computer readable storage device or storage disk such as a memory, a digital versatile disk (DVD), a compact disk (CD), a Blu-ray disk, etc. including the software and/or firmware. Further still, the example database proprietor apparatus 700 of FIG. 1 may include one or more elements, processes and/or devices in addition to, or instead of, those illustrated in FIG. 7, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 8:
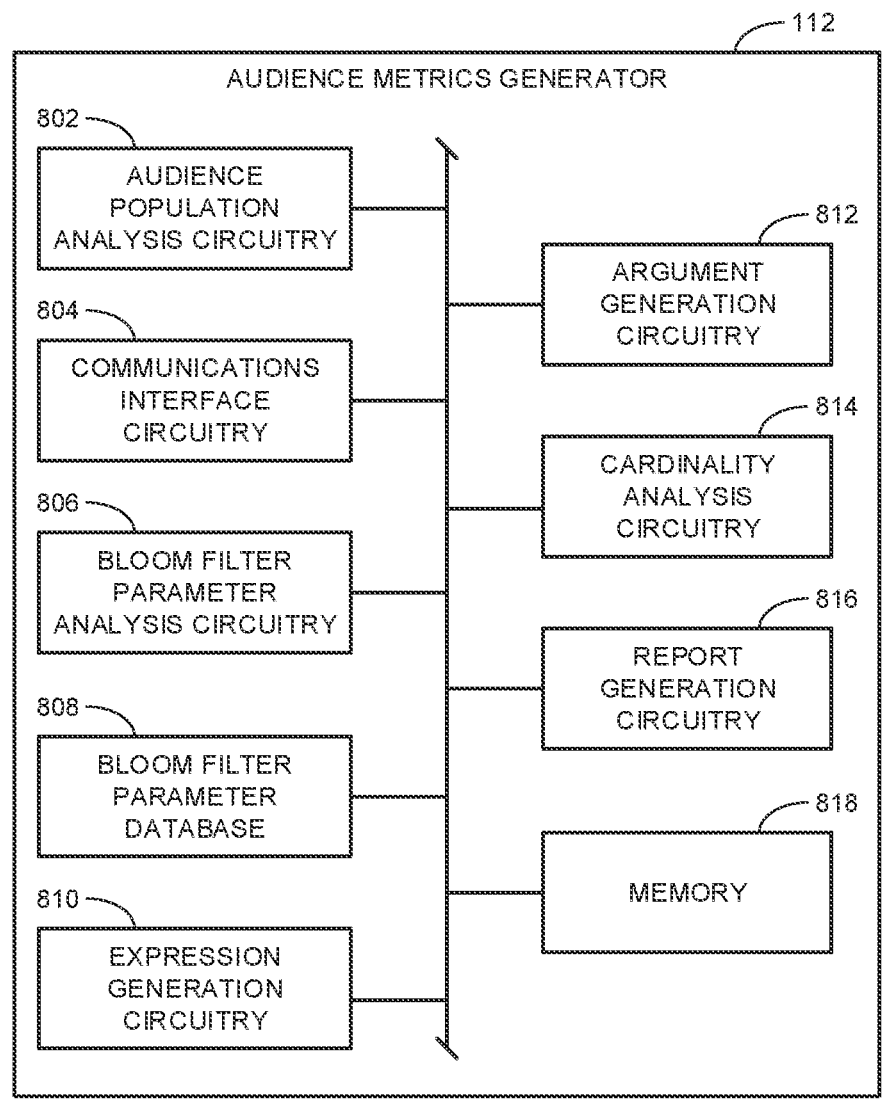
FIG. 8 is a block diagram of the example audience metric generator of FIG. 1.

FIG. 8 is a block diagram of an example implementation of the example audience metrics generator 112 of the AME 102 of FIG. 1. The example audience metrics generator 112 includes an example audience population analysis circuitry 802, an example communications interface circuitry 804, an example Bloom filter parameter analysis circuitry 806, an example Bloom filter parameter database 808, an example expression generation circuitry 810, an example argument generation circuitry 812, an example cardinality analysis circuitry 814, an example report generation circuitry 816, and an example memory 818.

The example audience population analysis circuitry 802 determines a universe estimate for the size of population that may potentially be reached by a particular media based on the geographic region where the media is distributed, the platforms through which the media is distributed, and/or any other suitable factor(s). The example communications interface circuitry 804 enables the audience metrics generator 112 to communicate with the database proprietors 106a-b.

The example Bloom filter parameter analysis circuitry 806 determines suitable parameters for Bloom filter arrays based on the universe estimate of the audience population analysis circuitry 802. More particularly, in some examples, the length of a Bloom filter array is determined based on a maximum expected number of users in an underlying dataset to be represented in the Bloom filter array. In some examples, the expected number of users is determined based on the universe estimate. Further, in some examples, the Bloom filter parameter analysis circuitry 806 determines the length of a Bloom filter array to provide a particular relative error (e.g., +/−5%) for an estimate of the cardinality of the Bloom filter array at a particular confidence level (e.g., 95%). Additionally or alternatively, in some examples, the Bloom filter parameter analysis circuitry 806 determines the relative error, at a particular confidence level, of the cardinality estimate based on a set length for the Bloom filter array.

In some examples, the Bloom filter parameter analysis circuitry 806 also determines parameters defining the hash function(s) used to evaluate PII data associated with particular users to be represented in the Bloom filter array. Further still, in some examples, the Bloom filter parameter analysis circuitry 806 determines parameters defining how outputs of the hash functions map to particular bits or elements of the Bloom filter array. In some examples, the parameters defining the hash function(s) and length of the Bloom filter array are stored in the Bloom filter parameter database 808. In some examples, the Bloom filter parameters stored in the database 808 may be provided to the database proprietors 106a-b via the example communications interface circuitry 804.

The example expression generation circuitry 810 determines or generates inclusive-exclusion expressions that define an audience size (e.g., a cardinality) for a particular user group of interest across multiple Bloom filter arrays. In some examples, the particular user group of interest corresponds to the full union of all Bloom filter arrays under consideration. However, in other examples, the particular user group of interest corresponds a particular subset of mutually exclusive disjoint datasets associated with the Bloom filter arrays. The particular user group of interest can correspond to any combination of the disjoint datasets. In some examples, the terms used in the inclusion-exclusion expression generated by the expression generation circuitry 810 are limited to either cardinalities of individual Bloom filter arrays or cardinalities of the unions of two or more Bloom filter arrays. As described above, the cardinalities of individual Bloom filter arrays and the cardinalities of the union of two or more Bloom can be directly estimated based on the counts of 0s in the associated Bloom filter arrays. Accordingly, limiting the terms in the inclusion-exclusion expression enables the estimation of the cardinality (e.g., the unique audience size) of the particular user group defined by the inclusion-exclusion expression.

In some examples, the expression generation circuitry 810 generates the inclusion-exclusion expression based on the relevant subset of disjoint datasets corresponding to the particular user group of interest. Thus, in some examples, the expression generation circuitry 810 first identifies the relevant subset of disjoint datasets before generating the inclusion-exclusion expression. Additionally or alternatively, in some examples, the expression generation circuitry 810 identifies a particular intersection and/or union of interest corresponding to the particular user group of interest without specifically identifying the individual disjoint sets included in the intersection.

In some examples, the relationships between the disjoint datasets and the unions of the Bloom filter arrays as well as the relationships between the intersections of the arrays and the unions of the arrays for different numbers of Bloom filters arrays may be defined in advance and stored in the example memory 818 for retrieval by the expression generation circuitry 810. For instance, in some examples, the relationships may be defined in a matrix M as defined in Equations 48 through 51. In other examples, the relationships and resulting expressions may be derived by the expression generation circuitry 810.

The example argument generation circuitry 812 determines or generates an argument for the logarithm defined in Equation 32 (e.g., $f(\{c_{t_i t_2} \ldots \})$). As discussed above in connection with Equation 32, the argument of the logarithm includes counts of 0s in the individual Bloom filter arrays and/or the bitwise unions of two or more of the Bloom filter arrays. More particularly, the logarithm includes ratios of the counts to the length of the Bloom filter arrays. In some examples, the argument generation circuitry 812 determines which particular ratios of counts to array length are included in the logarithm argument based on the particular cardinality terms included in the inclusion-exclusion expression generated by the expression generation circuitry 810. Further, the example argument generation circuitry 812 determines whether to include the ratio itself or the inverse of the ratio based on whether the corresponding cardinality term in the inclusion-exclusion expression is added or subtracted, respectively. Further still, the example argument generation circuitry 812 determines an exponent for each ratio (or inverse ratio) based on the constant coefficient in front of the corresponding cardinality term in the inclusion-exclusion expression.

The example cardinality analysis circuitry 814 evaluates Equation 32 based on the argument of the logarithm as defined by the argument generation circuitry 812 to estimate the cardinality or unique audience for the particular user group of interest. The values for m and k in Equation 32 are already known and defined by the Bloom filter parameters. However, in some examples, the cardinality analysis circuitry 814 first calculates the relevant counts in the logarithm argument. In this example, the counts corresponding to the number of elements set to 0 in a single Bloom filter array or the number of elements set to 0 in the bitwise union of two or more Bloom filter arrays. As discussed above, in some examples, the counts could be based on the number of elements set to 1 instead of the number set to 0. Once the counts have been calculated, the cardinality analysis circuitry 814 can complete the evaluation of Equation 32 to determine the estimate for the cardinality of the particular user group of interest.

In some examples, cardinality estimates are generated on a relatively frequent basis (e.g., once a day). Accordingly, where the Bloom filter arrays may be thousands of bits long and be representative of hundreds of thousands or even millions of users, it is necessary to implement the example process on a computer because such analysis cannot practically be performed by a human in their mind and/or using pen and paper in so short a time.

The example report generation circuitry 816 generates any suitable report conveying audience measurement information and estimates. In some examples, where the Bloom filter arrays correspond to exposure to an advertisement in an advertising campaign, the report generated by the report generation circuitry 816 includes an indication of reach of the advertising campaign. That is, the report includes an indication of the total number of unique individuals that were exposed to the advertisement during a relevant period of time. In some examples, the total number of unique individuals corresponds to the cardinality estimate for the union of multiple Bloom filter arrays as described above. In some examples, the report includes an indication of the total number of unique individuals exposed to media that are associated with one or more particular database proprietors but not other database proprietors (e.g., users registered only with the first database proprietor 106a but not the second database proprietor 106b).

In some examples, the audience metrics generator 112 includes means for generating an expression. For example, the means for generating an expression may be implemented by expression generation circuitry 810. In some examples, the expression generation circuitry 810 may be implemented by machine executable instructions such as that implemented by at least blocks 1010 and 1012 of FIG. 10, and block 1202 of FIG. 12 executed by processor circuitry, which may be implemented by the example processor circuitry 1412 of FIG. 14, the example processor circuitry 1500 of FIG. 15, and/or the example Field Programmable Gate Array (FPGA) circuitry 1600 of FIG. 16. In other examples, the expression generation circuitry 810 is implemented by other hardware logic circuitry, hardware implemented state machines, and/or any other combination of hardware, software, and/or firmware. For example, the expression generation circuitry 810 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the audience metrics generator 112 includes means for estimating an audience size. For example, the means for estimating an audience size may be implemented by cardinality analysis circuitry 814. In some examples, the cardinality analysis circuitry 814 may be implemented by machine executable instructions such as that implemented by at least blocks 1016, 1018, and 1020 of FIG. 10 and block 1204 of FIG. 12 executed by processor circuitry, which may be implemented by the example processor circuitry 1412 of FIG. 14, the example processor circuitry 1500 of FIG. 15, and/or the example Field Programmable Gate Array (FPGA) circuitry 1600 of FIG. 16. In other examples, the cardinality analysis circuitry 814 is implemented by other hardware logic circuitry, hardware implemented state machines, and/or any other combination of hardware, software, and/or firmware. For example, the cardinality analysis circuitry 814 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the audience metrics generator 112 includes means for determining an argument. For example, the means for determining an argument may be implemented by argument generation circuitry 812. In some examples, the argument generation circuitry 812 may be implemented by machine executable instructions such as that implemented by at least block 1014 of FIG. 10 and blocks 1102-1122 of FIG. 11 executed by processor circuitry, which may be implemented by the example processor circuitry 1412 of FIG. 14, the example processor circuitry 1500 of FIG. 15, and/or the example Field Programmable Gate Array (FPGA) circuitry 1600 of FIG. 16. In other examples, the argument generation circuitry 812 is implemented by other hardware logic circuitry, hardware implemented state machines, and/or any other combination of hardware, software, and/or firmware. For example, the argument generation circuitry 812 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the audience metrics generator 112 includes means for determining Bloom filter parameters. For example, the means for determining Bloom filter parameters may be implemented by Bloom filter parameter analysis circuitry 806. In some examples, the Bloom filter parameter analysis circuitry 806 may be implemented by machine executable instructions such as that implemented by at least block 1004 of FIG. 10 executed by processor circuitry, which may be implemented by the example processor circuitry 1412 of FIG. 14, the example processor circuitry 1500 of FIG. 15, and/or the example Field Programmable Gate Array (FPGA) circuitry 1600 of FIG. 16. In other examples, the Bloom filter parameter analysis circuitry 806 is implemented by other hardware logic circuitry, hardware implemented state machines, and/or any other combination of hardware, software, and/or firmware. For example, the Bloom filter parameter analysis circuitry 806 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

While an example manner of implementing the audience metrics generator 112 of FIG. 1 is illustrated in FIG. 8, one or more of the elements, processes and/or devices illustrated in FIG. 8 may be combined, divided, re-arranged, omitted, eliminated and/or implemented in any other way. Further, the example audience population analysis circuitry 802, the example communications interface circuitry 804, the example Bloom filter parameter analysis circuitry 806, the example Bloom filter parameter database 808, the example expression generation circuitry 810, the example argument generation circuitry 812, the example cardinality analysis circuitry 814, the example report generation circuitry 816, the example memory 818 and/or, more generally, the example audience metrics generator 112 of FIG. 8 may be implemented by hardware, software, firmware and/or any combination of hardware, software and/or firmware. Thus, for example, any of the example audience population analysis circuitry 802, the example communications interface circuitry 804, the example Bloom filter parameter analysis circuitry 806, the example Bloom filter parameter database 808, the example expression generation circuitry 810, the example argument generation circuitry 812, the example cardinality analysis circuitry 814, the example report generation circuitry 816, the example memory 818 and/or, more generally, the example audience metrics generator 112 could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example audience population analysis circuitry 802, the example communications interface circuitry 804, the example Bloom filter parameter analysis circuitry 806, the example Bloom filter parameter database 808, the example expression generation circuitry 810, the example argument generation circuitry 812, the example cardinality analysis circuitry 814, and/or the example report generation circuitry 816, the example memory 818 is/are hereby expressly defined to include a non-transitory computer readable storage device or storage disk such as a memory, a digital versatile disk (DVD), a compact disk (CD), a Blu-ray disk, etc. including the software and/or firmware. Further still, the example audience metrics generator 112 of FIG. 1 may include one or more elements, processes and/or devices in addition to, or instead of, those illustrated in FIG. 8, and/or may include more than one of any or all of the illustrated elements, processes and devices.

Figure 9:
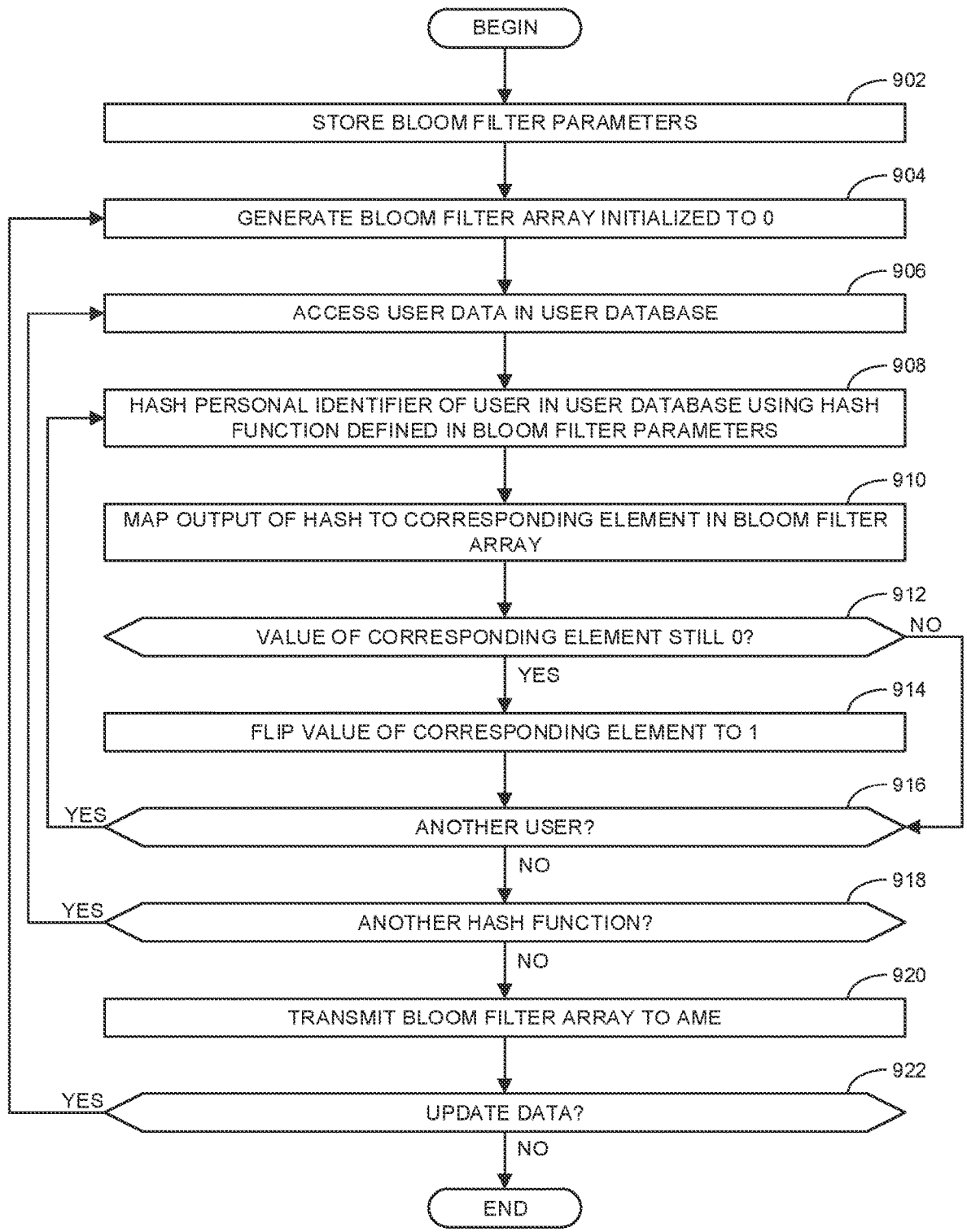
FIG. 9 is a flowchart representative of example machine readable instructions that may be executed and/or instantiated by example processor circuitry to implement the example database proprietor apparatus of FIGS. 1 and/or 7.

A flowchart representative of example hardware logic circuitry, machine readable instructions, hardware implemented state machines, and/or any combination thereof for implementing the database proprietor apparatus 700 of FIGS. 1 and/or 7 is shown in FIG. 9. The machine readable instructions may be one or more executable programs or portion(s) of an executable program for execution by processor circuitry, such as the processor circuitry 1312 shown in the example processor platform 1300 discussed below in connection with FIG. 13 and/or the example processor circuitry discussed below in connection with FIGS. 15 and/or 16. The program may be embodied in software stored on one or more non-transitory computer readable storage media such as a CD, a floppy disk, a hard disk drive, a DVD, a Blu-ray disk, a volatile memory (e.g., Random Access Memory (RAM) of any type, etc.), or a non-volatile memory (e.g., FLASH memory, an HDD, etc.) associated with the processor circuitry located in one or more hardware devices, but the entire program and/or parts thereof could alternatively be executed by one or more hardware device other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 9, many other methods of implementing the example database proprietor apparatus 700 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

Figure 10:
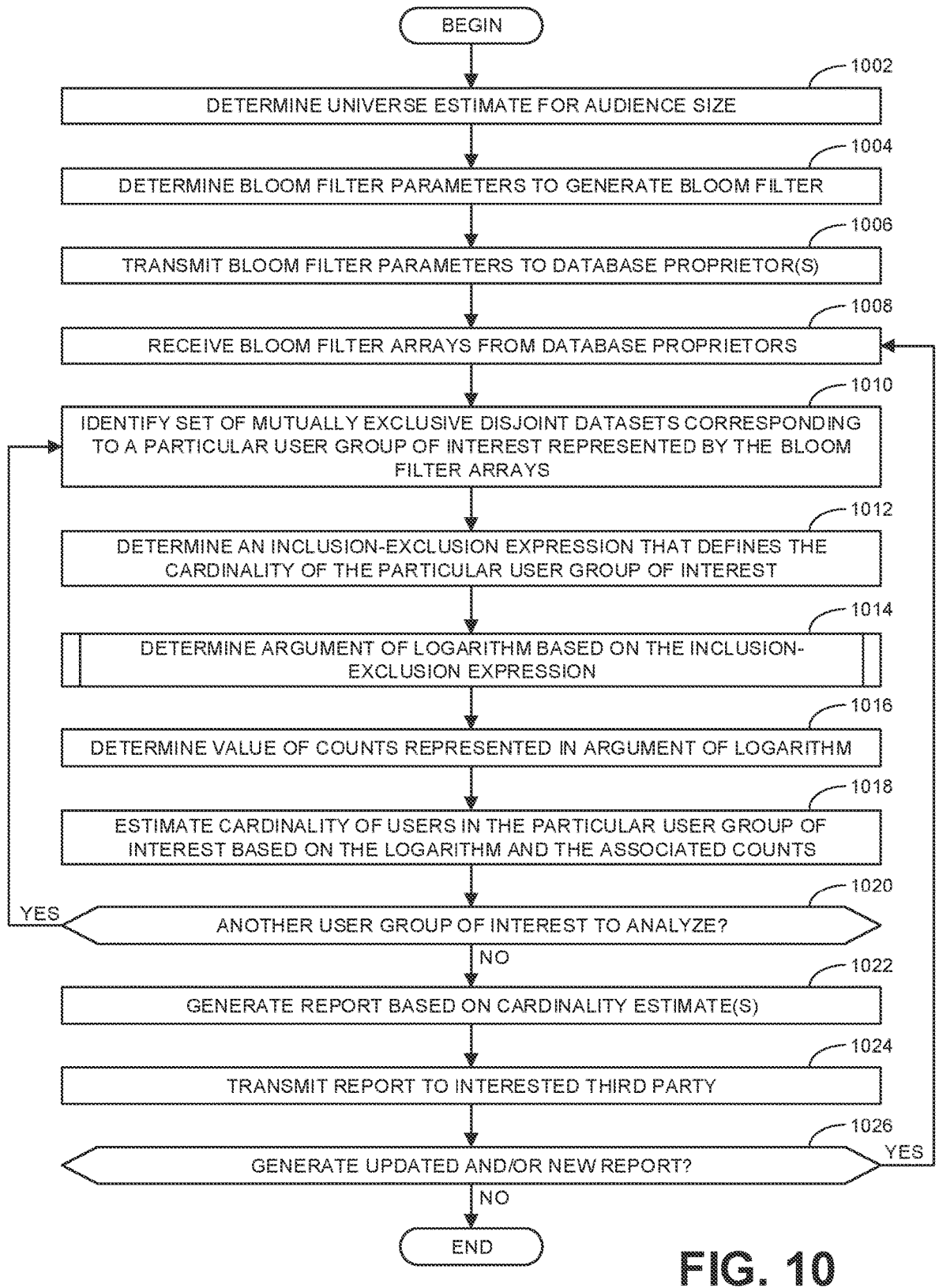
FIG. 10-12 are flowcharts representative of example machine readable instructions that may be executed and/or instantiated by example processor circuitry to implement the example audience metric generator of FIGS. 1 and/or 8.
Figure 11:
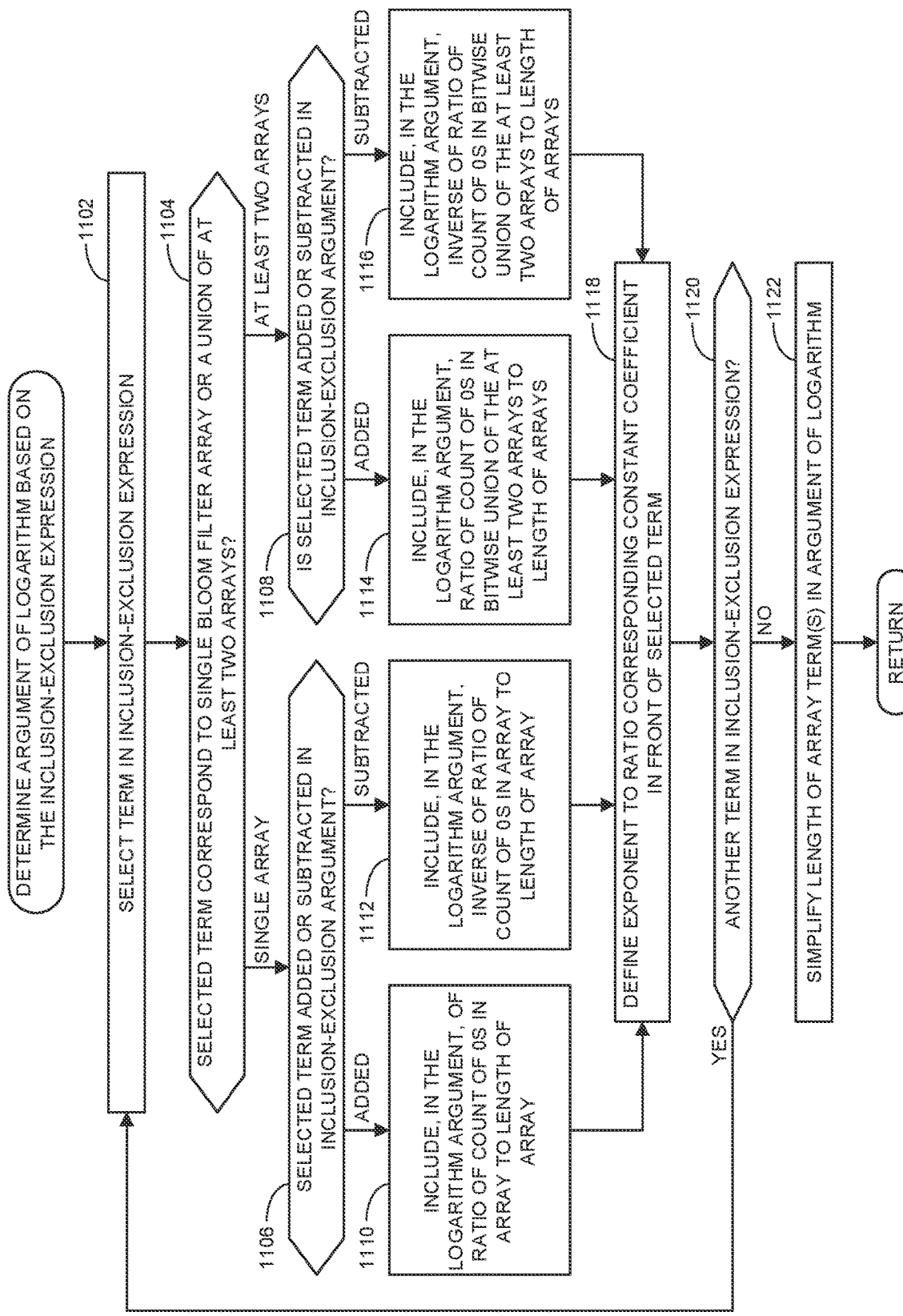
Figure 12:
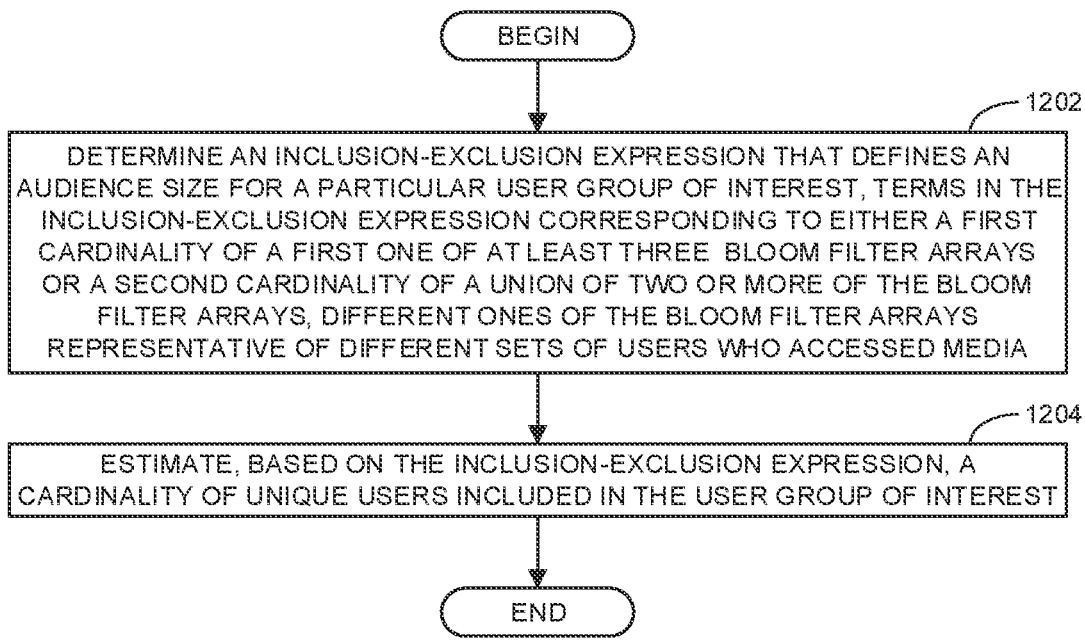

Flowcharts representative of example hardware logic circuitry, machine readable instructions, hardware implemented state machines, and/or any combination thereof for implementing the audience metrics generator 112 of FIGS. 1 and/or 8 are shown in FIGS. 10-12. The machine readable instructions may be one or more executable programs or portion(s) of an executable program for execution by processor circuitry, such as the processor 1412 shown in the example processor platform 1400 discussed below in connection with FIG. 14 and/or the example processor circuitry discussed below in connection with FIGS. 15 and/or 16. The program may be embodied in software stored on one or more non-transitory computer readable storage media such as a CD, a floppy disk, a hard disk drive, a DVD, a Blu-ray disk, a volatile memory (e.g., Random Access Memory (RAM) of any type, etc.), or a non-volatile memory (e.g., FLASH memory, an HDD, etc.) associated with the processor circuitry located in one or more hardware devices, but the entire program and/or parts thereof could alternatively be executed by one or more hardware device other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 10-12, many other methods of implementing the example audience metrics generator 112 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 9-12 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium are expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

In some examples, the program of FIG. 9 is independently implemented by each database proprietor 106a-b (FIG. 1) that is to provide a Bloom filter array to the AME 102 (FIG. 1) in connection with a particular item of media for which exposure metrics are desired. The program of FIG. 9 begins at block 902 where the example Bloom filter parameter database 706 (FIG. 7) stores Bloom filter parameters to generate a Bloom filter array. At block 904, the example Bloom filter array generation circuitry 710 (FIG. 7) generates a Bloom filter array initialized to 0. In some examples, the length of the Bloom filter array is defined by and/or agreed upon between the AME 102 and each database proprietor 106a-b. In some examples, the length is defined by the Bloom filter parameters generated at block 1004 of the example process of FIG. 10 discussed further below. At block 906, the example user data analysis circuitry 708 (FIG. 7) accesses user data in the user database 702. At block 908, the example Bloom filter array generation circuitry 710 (FIG. 7) hashes a personal identifier in the user database 702 using a hash function defined in the Bloom filter parameters. At block 910, the example Bloom filter array generation circuitry 710 maps an output of the hash to a corresponding element in the Bloom filter array. At block 912, the example Bloom filter array generation circuitry 710 determines whether the value of the corresponding element is still 0. If so, control advances to block 914 where the example Bloom filter array generation circuitry 710 flips the value of the corresponding element to 1. Thereafter, control advances to block 916. Returning to block 912, if the value of the corresponding bit has already been flipped to 1, control advances directly to block 916.

At block 916, the example Bloom filter array generation circuitry 710 determines whether there is another user. If so, control returns to block 908. If not, control advances to block 918 where the example Bloom filter array generation circuitry 710 determines whether there is another hash function. If so, control returns to block 906. Otherwise, control advances to block 918 where the example communications interface circuitry 704 transmits the final Bloom filter array to the AME 102. At block 922, the example Bloom filter array generation circuitry 710 determines whether to update the data. In some examples, data is updated on a relatively frequent basis (e.g., once a week, once a day, etc.). If the data is to be updated, control returns to block 904 to repeat the process. Otherwise, the example instructions of FIG. 9 ends.

The example program of FIG. 10 begins at block 1002 where the example audience population analysis circuitry 802 (FIG. 8) determines a universe estimate for an audience size. At block 1004, the example Bloom filter parameter analysis circuitry 806 (FIG. 8) determines Bloom filter parameters defining the distribution for the mapping of users to elements of a Bloom filter array. In some examples, the Bloom filter parameters include a length for the Bloom filter arrays that is determined based on the universe estimate. Additionally or alternatively, in some examples, the Bloom filter parameter analysis circuitry 806 determines the length that provides a cardinality estimate guaranteed to have a relative error no greater than a particular relative error at a particular confidence level. At block 1006, the example communications interface circuitry 804 (FIG. 8) transmits the Bloom filter parameters to the database proprietors 106a-b. At block 1008, the example communications interface circuitry 804 receives Bloom filter arrays (e.g., the sketch data 132a-b of FIG. 1) from the database proprietors 106a-b (FIG. 1). In some examples, the Bloom filter arrays are received via the communications interface circuitry 804 in connection with the transmission of block 920 of FIG. 9.

At block 1010, the example expression generation circuitry 810 identifies a set of mutually exclusive disjoint datasets corresponding to a particular user group of interest represented by the Bloom filter arrays. In some examples, instead of identifying the set of disjoint datasets, the expression generation circuitry 810 identifies a particular combination of unions and/or intersections associated with the set of disjoint datasets. At block 1012, the example expression generation circuitry 810 determines an inclusion-exclusion expression that defines the cardinality of the particular user group of interest. In some examples, the inclusion-exclusion expression contains terms corresponding to either the cardinality associated with individual ones of the Bloom filter arrays or the cardinality associated with unions of two or more of the Bloom filter arrays. At block 1014, the example argument generation circuitry 812 determines an argument of a logarithm (e.g., the logarithm of Equation 32) based on the inclusion-exclusion expression. Further detail regarding the implementation of block 1014 is provided below in connection with FIG. 11. As detailed in the example process of FIG. 11, the argument of the logarithm includes counts of 0s in the individual ones of the Bloom filter arrays associated with the terms in the inclusion-exclusion express and includes counts of 0s in the bitwise union of the two or more Bloom filter arrays associated with the terms corresponding to the union of the Bloom filter arrays.

At block 1016, the example cardinality analysis circuitry 814 determines the value of the counts represented in the argument of the logarithm. At block 1018, the example cardinality analysis circuitry 814 estimates the cardinality of users in the particular user group of interest based on the logarithm and the associated counts. More particularly, the example cardinality analysis circuitry 814 estimates the cardinality of the particular user group of interest by evaluating Equation 32. At block 1020, the example cardinality analysis circuitry 814 determines whether another user group of interest is to be analyzed. If so, control returns to block 1010. Otherwise, control advances to block 1022 where the example report generation circuitry 816 generates a report based on the cardinality estimate(s). At block 1024, the example communications interface circuitry 804 transmits the report to an interested third party. At block 1026, the example report generation circuitry 816 determines whether to generate an updated and/or new report. As mentioned above, in some examples, reports are generated on a relatively frequent basis (e.g., weekly, daily, etc.). If an updated and/or new report is to be generated, control returns to block 1008. Otherwise, the example program of FIG. 14 ends.

FIG. 11 is a flowchart illustrating an example implementation of block 1014. The example program begins at block 1102 where the example argument generation circuitry 812 selects a term in the inclusion-exclusion expression. As described above, the terms correspond to either cardinalities of individual Bloom filter arrays or cardinalities of the bitwise union of two or more Bloom filter arrays. At block 1104, the example argument generation circuitry 812 determines whether the selected term corresponds to a single Bloom filter array or a union of at least two arrays. If the selected term corresponds to a single array, control advances to block 1106. If the selected term corresponds to a union of at least two arrays, control advances to block 1108.

At block 1106 (following determination that the selected term corresponds to a single Bloom filter array), the example argument generation circuitry 812 determines whether the selected term is added or subtracted in the inclusion-exclusion expression. If added, control advances to block 1110 where the example argument generation circuitry 812 includes, in the logarithm argument, the ratio of the count of 0s in the Bloom filter array to the length of the array. Thereafter, control advances to block 1118. Returning to block 1106, if the example argument generation circuitry 812 determines that the selected term is subtracted, control advances to block 1112 where the example argument generation circuitry 812 includes, in the logarithm argument, the inverse of the ratio of the count of 0s in the Bloom filter array to the length of the array. Thereafter, control advances to block 1118.

At block 1108 (following determination that the selected term corresponds to at least two Bloom filter arrays), the example argument generation circuitry 812 determines whether the selected term is added or subtracted in the inclusion-exclusion expression. If added, control advances to block 1114 where the example argument generation circuitry 812 includes, in the logarithm argument, the ratio of the count of 0s in the bitwise union of the at least two Bloom filter arrays to the length of the arrays. Thereafter, control advances to block 1118. Returning to block 1106, if the example argument generation circuitry 812 determines that the selected term is subtracted, control advances to block 1116 where the example argument generation circuitry 812 includes, in the logarithm argument, the inverse of the ratio of the count of 0s in the bitwise union of the at least two Bloom filter array to the length of the arrays. Thereafter, control advances to block 1118.

At block 1118, the example argument generation circuitry 812 defines an exponent to the ratio corresponding to the constant coefficient in front of the selected term. At block 1120, the example argument generation circuitry 812 determines whether there is another term in the inclusion-exclusion expression. If so, control returns to block 1102. Otherwise, control advances to block 1122 where the example argument generation circuitry 812 simplifies the length of array parameter(s) included in the logarithm argument. That is, inasmuch as the length is part of each ratio included in the logarithm argument and some ratios may be inverted, the length parameter may cancel out or at least simplify. Thereafter, the example process of FIG. 11 ends and returns to complete the example process of FIG. 10.

The example program of FIG. 12 begins at block 1202 where the example expression generation circuitry 810 determines an inclusion-exclusion expression that defines an audience size for a particular user group of interest, terms in the inclusion-exclusion expression corresponding to either a first cardinality of a first one of at least three Bloom filter arrays or a second cardinality of a union of two or more of the Bloom filter arrays, different ones of the Bloom filter arrays representative of different sets of users who accessed media. At block 1204, the example cardinality analysis circuitry 814 estimates, based on the inclusion-exclusion expression, a cardinality of unique users included in the user group of interest. Thereafter, the example process of FIG. 12 ends.

Figure 13:
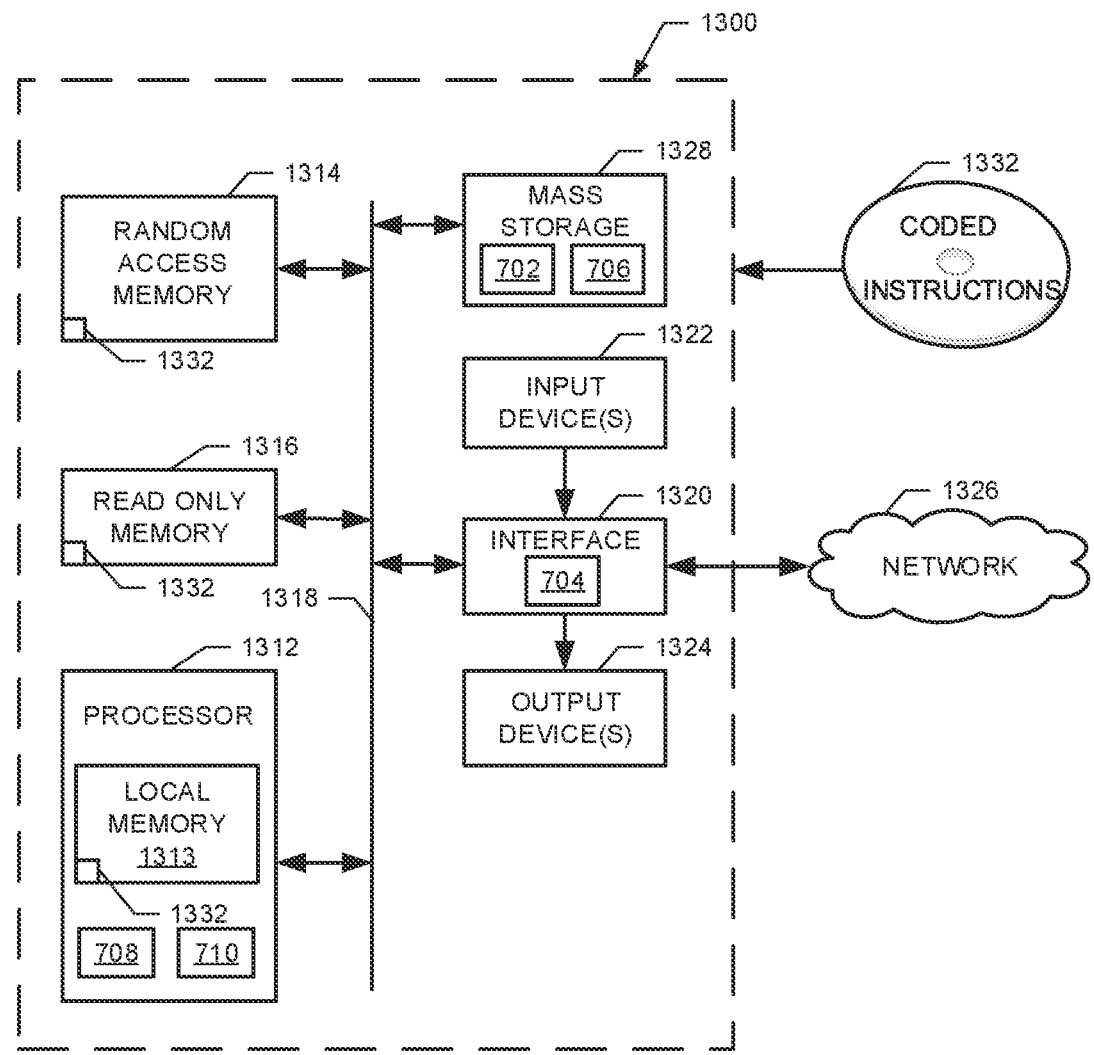
FIG. 13 is a block diagram of an example processing platform including processor circuitry structured to execute and/or instantiate the example machine readable instructions of FIG. 9 to implement the example database proprietor apparatus of FIGS. 1 and/or 7.

FIG. 13 is a block diagram of an example processor platform 1300 structured to execute and/or instantiate the machine readable instructions and/or operations of FIG. 9 to implement the database proprietor apparatus 700 of FIGS. 1 and/or 7. The processor platform 1300 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 1300 of the illustrated example includes processor circuitry 1312. The processor circuitry 1312 of the illustrated example is hardware. For example, the processor circuitry 1312 can be implemented by one or more integrated circuits, logic circuits, FPGAs microprocessors, CPUs, GPUs, DSPs, and/or microcontrollers from any desired family or manufacturer. The processor circuitry may be implemented by one or more a semiconductor based (e.g., silicon based) devices. In this example, the processor circuitry 1312 implements the example user data analysis circuitry 708 and the example Bloom filter array generation circuitry 710.

The processor circuitry 1312 of the illustrated example includes a local memory 1313 (e.g., a cache, registers, etc.). The processor circuitry 1312 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes interface circuitry 1320. The interface circuitry 1320 may be implemented by hardware in accordance with any type of interface standard, such as an Ethernet interface, a universal serial bus (USB) interface, a Bluetooth® interface, a near field communication (NFC) interface, a PCI interface, and/or a PCIe interface. In this example, the interface circuitry 1320 implements the example communications interface circuitry 704.

In the illustrated example, one or more input devices 1322 are connected to the interface circuitry 1320. The input device(s) 1322 permit(s) a user to enter data and/or commands into the processor circuitry 1312. The input device(s) can be implemented by, for example, an audio sensor, a microphone, a camera (still or video), a keyboard, a button, a mouse, a touchscreen, a track-pad, a trackball, an isopoint device, and/or a voice recognition system.

One or more output devices 1324 are also connected to the interface circuitry 1320 of the illustrated example. The output devices 1324 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer and/or speaker. The interface circuitry 1320 of the illustrated example, thus, typically includes a graphics driver card, a graphics driver chip and/or graphics processor circuitry such as a GPU.

The interface circuitry 1320 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1326. The communication can be via, for example, an Ethernet connection, a digital subscriber line (DSL) connection, a telephone line connection, a coaxial cable system, a satellite system, a line-of-site wireless system, a cellular telephone system, an optical connection, etc.

The processor platform 1300 of the illustrated example also includes one or more mass storage devices 1328 to store software and/or data. Examples of such mass storage devices 1328 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 1332, which may be implemented by the machine readable instructions of FIG. 9 may be stored in the mass storage device 1328, in the volatile memory 1314, in the non-volatile memory 1316, and/or on a removable non-transitory computer readable storage medium such as a CD or DVD. In this example, the mass storage devices 1328 implement the example user database 702 and the example Bloom filter parameter database 706.

Figure 14:
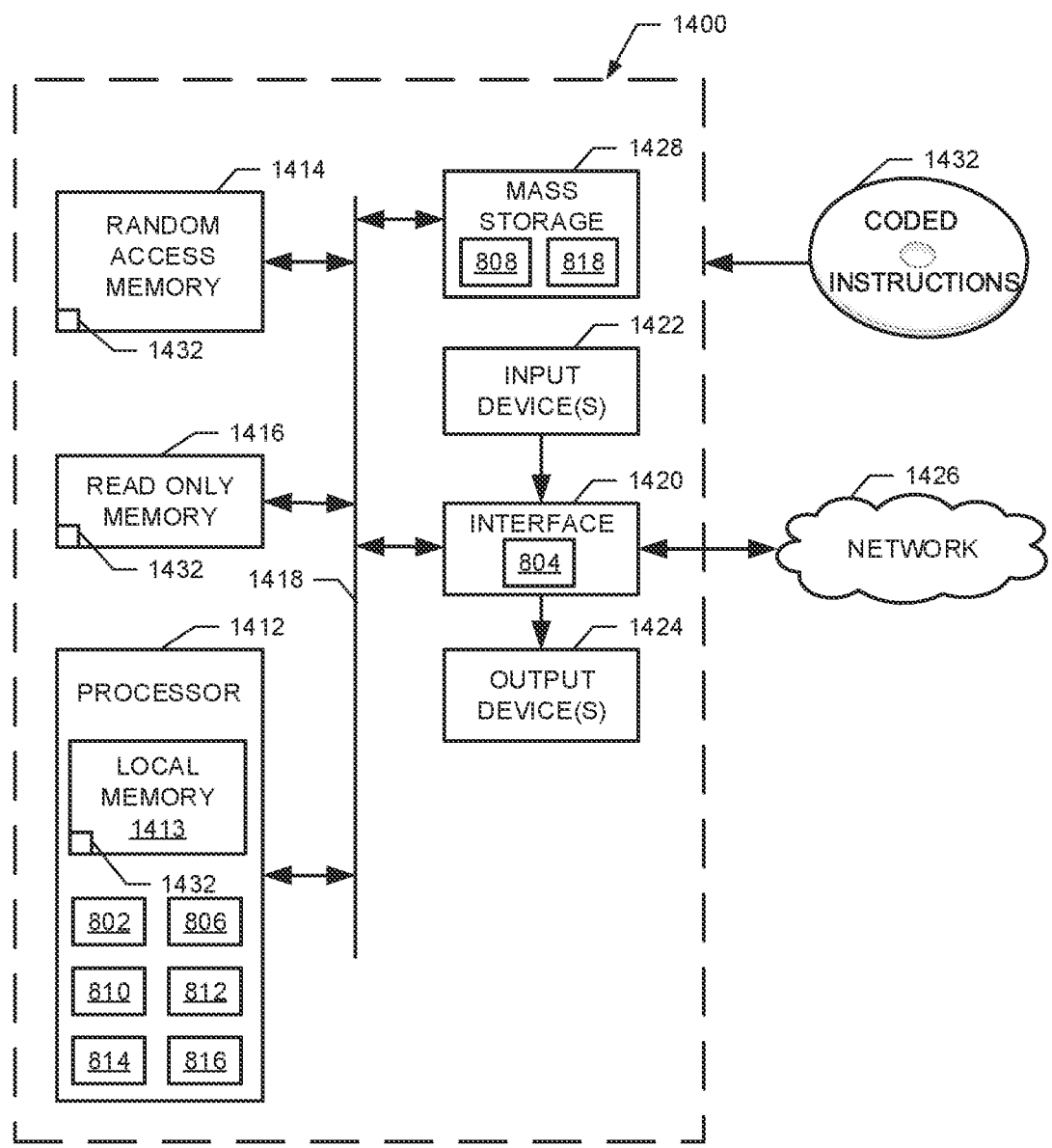
FIG. 14 is a block diagram of an example processing platform including processor circuitry structured to execute and/or instantiate the example machine readable instructions of FIGS. 10-12 to implement the example audience metric generator of FIGS. 1 and/or 8.

FIG. 14 is a block diagram of an example processor platform 1400 structured to execute and/or instantiate the machine readable instructions and/or operations of FIGS. 10-12 to implement the audience metrics generator 112 of FIGS. 1 and/or 8. The processor platform 1400 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 1400 of the illustrated example includes processor circuitry 1412. The processor circuitry 1412 of the illustrated example is hardware. For example, the processor circuitry 1412 can be implemented by one or more integrated circuits, logic circuits, FPGAs microprocessors, CPUs, GPUs, DSPs, and/or microcontrollers from any desired family or manufacturer. The processor circuitry may be implemented by one or more a semiconductor based (e.g., silicon based) devices. In this example, the processor circuitry 1412 implements the example audience population analysis circuitry 802, the example Bloom filter parameter analysis circuitry 806, the example expression generation circuitry 810, the example argument generation circuitry 812, the example cardinality analysis circuitry 814, and the example report generation circuitry 816.

The processor circuitry 1412 of the illustrated example includes a local memory 1413 (e.g., a cache, registers, etc.). The processor circuitry 1412 of the illustrated example is in communication with a main memory including a volatile memory 1414 and a non-volatile memory 1416 via a bus 1418. The volatile memory 1414 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1416 may be implemented by flash memory and/or any other desired type of memory device. Access to the main memory 1414, 1416 is controlled by a memory controller.

The processor platform 1400 of the illustrated example also includes interface circuitry 1420. The interface circuitry 1420 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1422 are connected to the interface circuitry 1420. The input device(s) 1422 permit(s) a user to enter data and/or commands into the processor circuitry 1412. The input device(s) can be implemented by, for example, an audio sensor, a microphone, a camera (still or video), a keyboard, a button, a mouse, a touchscreen, a track-pad, a trackball, an isopoint device, and/or a voice recognition system.

One or more output devices 1424 are also connected to the interface circuitry 1420 of the illustrated example. The output devices 1424 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer and/or speaker. The interface circuitry 1420 of the illustrated example, thus, typically includes a graphics driver card, a graphics driver chip and/or graphics processor circuitry such as a GPU.

The interface circuitry 1420 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1426. The communication can be via, for example, an Ethernet connection, a digital subscriber line (DSL) connection, a telephone line connection, a coaxial cable system, a satellite system, a line-of-site wireless system, a cellular telephone system, an optical connection, etc.

The processor platform 1400 of the illustrated example also includes one or more mass storage devices 1428 to store software and/or data. Examples of such mass storage devices 1428 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 1432, which may be implemented by the machine readable instructions of FIGS. 10-12 may be stored in the mass storage device 1428, in the volatile memory 1414, in the non-volatile memory 1416, and/or on a removable non-transitory computer readable storage medium such as a CD or DVD.

Figure 15:
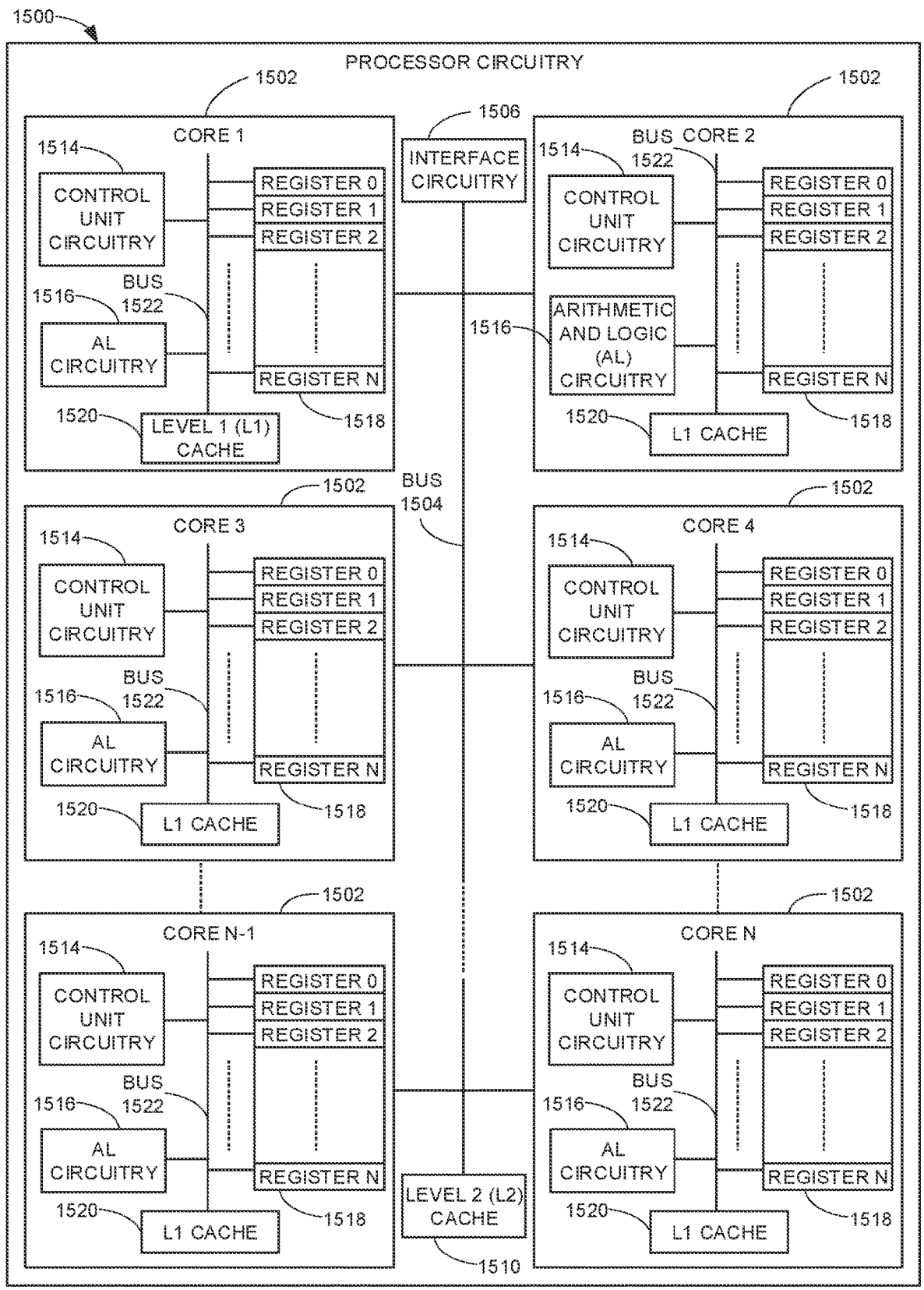
FIG. 15 is a block diagram of an example implementation of the processor circuitry of FIGS. 13 and/or 14.

FIG. 15 is a block diagram of an example implementation of the processor circuitry 1312 of FIG. 13 or the processor circuitry 1412 of FIG. 14. In this example, the processor circuitry 1312 of FIG. 13 or the processor circuitry 1412 of FIG. 14 is implemented by a microprocessor 1500. For example, the microprocessor 1500 may implement multi-core hardware circuitry such as a CPU, a DSP, a GPU, an XPU, etc. Although it may include any number of example cores 1502 (e.g., 1 core), the microprocessor 1500 of this example is a multi-core semiconductor device including N cores. The cores 1502 of the microprocessor 1500 may operate independently or may cooperate to execute machine readable instructions. For example, machine code corresponding to a firmware program, an embedded software program, or a software program may be executed by one of the cores 1502 or may be executed by multiple ones of the cores 1502 at the same or different times. In some examples, the machine code corresponding to the firmware program, the embedded software program, or the software program is split into threads and executed in parallel by two or more of the cores 1502. The software program may correspond to a portion or all of the machine readable instructions and/or operations represented by the flowchart of FIG. 9 executed and/or instantiated by processor circuitry 1312 of FIG. 13. Alternatively, the software program may correspond to a portion or all of the machine readable instructions and/or operations represented by the flowcharts of FIGS. 10-12 executed and/or instantiated by processor circuitry 1412 of FIG. 14.

The cores 1502 may communicate by an example bus 1504. In some examples, the bus 1504 may implement a communication bus to effectuate communication associated with one(s) of the cores 1502. For example, the bus 1504 may implement at least one of an Inter-Integrated Circuit (I2C) bus, a Serial Peripheral Interface (SPI) bus, a PCI bus, or a PCIe bus. Additionally or alternatively, the bus 1504 may implement any other type of computing or electrical bus. The cores 1502 may obtain data, instructions, and/or signals from one or more external devices by example interface circuitry 1506. The cores 1502 may output data, instructions, and/or signals to the one or more external devices by the interface circuitry 1506. Although the cores 1502 of this example include example local memory 1520 (e.g., Level 1 (L1) cache that may be split into an L1 data cache and an L1 instruction cache), the microprocessor 1500 also includes example shared memory 1510 that may be shared by the cores (e.g., Level 2 (L2) cache)) for high-speed access to data and/or instructions. Data and/or instructions may be transferred (e.g., shared) by writing to and/or reading from the shared memory 1510. The local memory 1520 of each of the cores 1502 and the shared memory 1510 may be part of a hierarchy of storage devices including multiple levels of cache memory and the main memory (e.g., the main memory 1314, 1316 of FIG. 13 or the main memory 1414, 1416 of FIG. 14). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1502 may be referred to as a CPU, DSP, GPU, etc., or any other type of hardware circuitry. Each core 1502 includes control unit circuitry 1514, arithmetic and logic (AL) circuitry (sometimes referred to as an ALU) 1516, a plurality of registers 1518, the L1 cache 1520, and an example bus 1522. Other structures may be present. For example, each core 1502 may include vector unit circuitry, single instruction multiple data (SIMD) unit circuitry, load/store unit (LSU) circuitry, branch/jump unit circuitry, floating-point unit (FPU) circuitry, etc. The control unit circuitry 1514 includes semiconductor-based circuits structured to control (e.g., coordinate) data movement within the corresponding core 1502. The AL circuitry 1516 includes semiconductor-based circuits structured to perform one or more mathematic and/or logic operations on the data within the corresponding core 1502. The AL circuitry 1516 of some examples performs integer based operations. In other examples, the AL circuitry 1516 also performs floating point operations. In yet other examples, the AL circuitry 1516 may include first AL circuitry that performs integer based operations and second AL circuitry that performs floating point operations. In some examples, the AL circuitry 1516 may be referred to as an Arithmetic Logic Unit (ALU). The registers 1518 are semiconductor-based structures to store data and/or instructions such as results of one or more of the operations performed by the AL circuitry 1516 of the corresponding core 1502. For example, the registers 1518 may include vector register(s), SIMD register(s), general purpose register(s), flag register(s), segment register(s), machine specific register(s), instruction pointer register(s), control register(s), debug register(s), memory management register(s), machine check register(s), etc. The registers 1518 may be arranged in a bank as shown in FIG. 15. Alternatively, the registers 1518 may be organized in any other arrangement, format, or structure including distributed throughout the core 1502 to shorten access time. The bus 1522 may implement at least one of an I2C bus, a SPI bus, a PCI bus, or a PCIe bus Each core 1502 and/or, more generally, the microprocessor 1500 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1500 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 16:
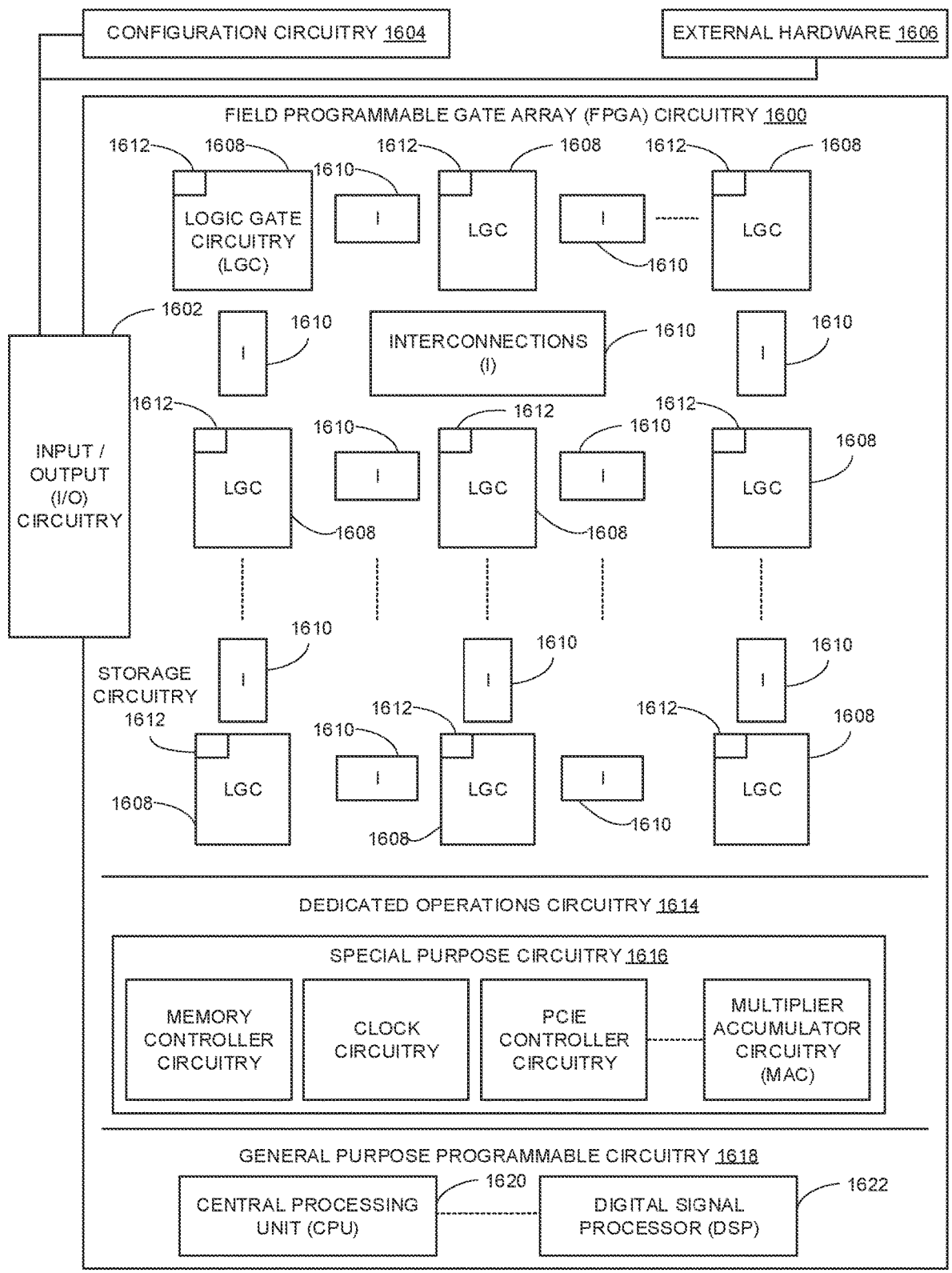
FIG. 16 is a block diagram of another example implementation of the processor circuitry of FIGS. 13 and/or 14.

FIG. 16 is a block diagram of another example implementation of the processor circuitry 1312 of FIG. 13 or the processor circuitry 1412 of FIG. 14. In this example, the processor circuitry 1312, 1412 is implemented by FPGA circuitry 1600. The FPGA circuitry 1600 can be used, for example, to perform operations that could otherwise be performed by the example microprocessor 1500 of FIG. 15 executing corresponding machine readable instructions. However, once configured, the FPGA circuitry 1600 instantiates the machine readable instructions in hardware and, thus, can often execute the operations faster than they could be performed by a general purpose microprocessor executing the corresponding software.

More specifically, in contrast to the microprocessor 1500 of FIG. 15 described above (which is a general purpose device that may be programmed to execute some or all of the machine readable instructions represented by the flowcharts of FIGS. 9, 10, 11, and/or 12 but whose interconnections and logic circuitry are fixed once fabricated), the FPGA circuitry 1600 of the example of FIG. 16 includes interconnections and logic circuitry that may be configured and/or interconnected in different ways after fabrication to instantiate, for example, some or all of the machine readable instructions represented by the flowcharts of FIGS. 9, 10, 11, and/or 12. In particular, the FPGA 1600 may be thought of as an array of logic gates, interconnections, and switches. The switches can be programmed to change how the logic gates are interconnected by the interconnections, effectively forming one or more dedicated logic circuits (unless and until the FPGA circuitry 1600 is reprogrammed). The configured logic circuits enable the logic gates to cooperate in different ways to perform different operations on data received by input circuitry. Those operations may correspond to some or all of the software represented by the flowcharts of FIGS. 9, 10, 11, and/or 12. As such, the FPGA circuitry 1600 may be structured to effectively instantiate some or all of the machine readable instructions of the flowcharts of FIGS. 9, 10, 11, and/or 12 as dedicated logic circuits to perform the operations corresponding to those software instructions in a dedicated manner analogous to an ASIC. Therefore, the FPGA circuitry 1600 may perform the operations corresponding to the some or all of the machine readable instructions of FIGS. 9, 10, 11, and/or 12 faster than the general purpose microprocessor can execute the same.

In the example of FIG. 16, the FPGA circuitry 1600 is structured to be programmed (and/or reprogrammed one or more times) by an end user by a hardware description language (HDL) such as Verilog. The FPGA circuitry 1600 of FIG. 16, includes example input/output (I/O) circuitry 1602 to obtain and/or output data to/from example configuration circuitry 1604 and/or external hardware (e.g., external hardware circuitry) 1606. For example, the configuration circuitry 1604 may implement interface circuitry that may obtain machine readable instructions to configure the FPGA circuitry 1600, or portion(s) thereof. In some such examples, the configuration circuitry 1604 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1606 may implement the microprocessor 1500 of FIG. 15. The FPGA circuitry 1600 also includes an array of example logic gate circuitry 1608, a plurality of example configurable interconnections 1610, and example storage circuitry 1612. The logic gate circuitry 1608 and interconnections 1610 are configurable to instantiate one or more operations that may correspond to at least some of the machine readable instructions of FIGS. 9, 10, 11, and/or 12 and/or other desired operations. The logic gate circuitry 1508 shown in FIG. 16 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1608 to enable configuration of the electrical structures and/or the logic gates to form circuits to perform desired operations. The logic gate circuitry 1608 may include other electrical structures such as look-up tables (LUTs), registers (e.g., flip-flops or latches), multiplexers, etc.

The interconnections 1610 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1608 to program desired logic circuits.

The storage circuitry 1612 of the illustrated example is structured to store result(s) of the one or more of the operations performed by corresponding logic gates. The storage circuitry 1612 may be implemented by registers or the like. In the illustrated example, the storage circuitry 1612 is distributed amongst the logic gate circuitry 1608 to facilitate access and increase execution speed.

The example FPGA circuitry 1600 of FIG. 16 also includes example Dedicated Operations Circuitry 1614. In this example, the Dedicated Operations Circuitry 1614 includes special purpose circuitry 1616 that may be invoked to implement commonly used functions to avoid the need to program those functions in the field. Examples of such special purpose circuitry 1616 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1600 may also include example general purpose programmable circuitry 1618 such as an example CPU 1620 and/or an example DSP 1622. Other general purpose programmable circuitry 1618 may additionally or alternatively be present such as a GPU, an XPU, etc., that can be programmed to perform other operations.

Although FIGS. 15 and 16 illustrate two example implementations of the processor circuitry 1312 of FIG. 13 and/or the processor circuitry 1412 of FIG. 14, many other approaches are contemplated. For example, as mentioned above, modern FPGA circuitry may include an on-board CPU, such as one or more of the example CPU 1620 of FIG. 16. Therefore, the processor circuitry 1312 of FIG. 13 and/or the processor circuitry 1412 of FIG. 14 may additionally be implemented by combining the example microprocessor 1500 of FIG. 15 and the example FPGA circuitry 1600 of FIG. 16. In some such hybrid examples, a first portion of the machine readable instructions represented by the flowcharts of FIGS. 9, 10, 11, and/or 12 may be executed by one or more of the cores 1502 of FIG. 15 and a second portion of the machine readable instructions represented by the flowcharts of FIGS. 9, 10, 11, and/or 12 may be executed by the FPGA circuitry 1600 of FIG. 16.

In some examples, the processor circuitry 1312 of FIG. 13 and/or the processor circuitry 1412 of FIG. 14 may be in one or more packages. For example, the processor circuitry 1500 of FIG. 15 and/or the FPGA circuitry 1600 of FIG. 16 may be in one or more packages. In some examples, an XPU may be implemented by the processor circuitry 1312 of FIG. 13 and/or the processor circuitry 1412 of FIG. 14, which may be in one or more packages. For example, the XPU may include a CPU in one package, a DSP in another package, a GPU in yet another package, and an FPGA in still yet another package.

From the foregoing, it will be appreciated that example methods, apparatus and articles of manufacture have been disclosed that enable the estimation of the cardinality across the union of any number of Bloom filter arrays. Further, examples disclosed herein enable the estimation of the cardinality of any particular combination of disjoint datasets associated with multiple Bloom filter arrays in a memory and processor efficient manner because the cardinalities of all disjoint sets do not need to be calculated. Rather, estimations of the cardinality of the overall union of multiple Bloom filter arrays or any portion thereof defined by a particular set of disjoint sets is achieved by identifying a relevant subset of unions of the Bloom filter arrays corresponding to the user group of interest based on the inclusion-exclusion principle. Furthermore, based on principles of logarithms, the terms in an associated inclusion-exclusion expression can be combined into a single logarithm argument with the only values to be solved for being counts of 0s in particular Bloom filter arrays and/or bitwise unions of two or more such arrays, thereby enabling the estimation of cardinalities of user groups of interest in an efficient manner. The disclosed methods, apparatus and articles of manufacture are accordingly directed to one or more improvement(s) in the operation of a machine such as a computer or other electronic and/or mechanical device. Furthermore, examples disclosed herein provide the practical benefit of enabling database proprietors to share summary statistics (e.g., Bloom filter arrays) that preserve the privacy of users while still enabling reliable estimate of the cardinality of the union of such Bloom filter arrays indicative of unique audience sizes of media accessed by users represented by the Bloom filter arrays.

Example 1 includes an apparatus comprising at least one memory, instructions in the apparatus, and processor circuitry to execute and/or instantiate the instructions to determine an inclusion-exclusion expression that defines an audience size for a user group of interest, terms in the inclusion-exclusion expression corresponding to either a first cardinality of a first one of at least three Bloom filter arrays or a second cardinality of a union of two or more of the Bloom filter arrays, different ones of the Bloom filter arrays representative of different sets of users who accessed media, and estimate, based on the inclusion-exclusion expression, the audience size of the user group of interest.

Example 2 includes the apparatus of example 1, wherein the processor circuitry is to determine an argument for a logarithm based on the inclusion-exclusion expression, and estimate the audience size based on the logarithm.

Example 3 includes the apparatus of example 2, wherein the argument includes at least one of (i) a first ratio of a first count of array elements with a particular value in the first Bloom filter array to a length of the Bloom filter arrays or (ii) a second ratio of a second count of array elements with the particular value in a bitwise union of two or more of the Bloom filter arrays.

Example 4 includes the apparatus of example 3, wherein the particular value is example 0 includes example 5 includes the apparatus of example 3, wherein the argument includes the first ratio or the second ratio when the corresponding terms in the inclusion-exclusion expression are added, and the argument includes an inverse of the first ratio or an inverse of the second ratio when the corresponding terms in the inclusion-exclusion expression are subtracted.

Example 6 includes the apparatus of example 3, wherein the first ratio and the second ratio include respective exponents corresponding to respective constant coefficients in front of the corresponding terms in the inclusion-exclusion expression.

Example 7 includes the apparatus of example 1, wherein the processor circuitry is to identify a subset of mutually exclusive disjoint datasets associated with the different sets of users, the subset corresponding to the user group of interest, the inclusion-exclusion expression identified based on the subset.

Example 8 includes the apparatus of example 7, wherein the subset corresponds to all of the mutually exclusive disjoint datasets, all of the mutually exclusive disjoint datasets corresponding to a union of all the different sets of users.

Example 9 includes the apparatus of example 7, wherein the subset corresponds to less than a union of all the different sets of users.

Example 10 includes the apparatus of example 1, wherein the processor circuitry is to determine a length for ones of the Bloom filter arrays that provide a relative error in the audience size estimate no greater than a relative error at a confidence level.

Example 11 includes the apparatus of example 1, wherein the processor circuitry is to determine a relative error, at a confidence level, in the estimate of the audience size based on a length of ones of the Bloom filter arrays.

Example 12 includes the apparatus of example 1, wherein different ones of the Bloom filter arrays are generated by different computers of different database proprietors, different ones of the different sets of users corresponding to ones of the users registered with respective ones of the different database proprietors.

Example 13 includes an apparatus comprising at least one memory, and processor circuitry including one or more of at least one of a central processing unit, a graphic processing unit, or a digital signal processor, the at least one of the central processing unit, the graphic processing unit, or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and the interconnections to perform one or more second operations corresponding to the instructions, the storage circuitry to store a result of the one or more second operations, or Application Specific Integrate Circuitry (ASIC) including logic gate circuitry to perform one or more third operations corresponding to the instructions, the processor circuitry to perform at least one of the first operations, the second operations or the third operations to instantiate expression generation circuitry to determine an inclusion-exclusion expression that defines an audience size for a user group of interest, terms in the inclusion-exclusion expression corresponding to either a first cardinality of a first one of at least three Bloom filter arrays or a second cardinality of a union of two or more of the Bloom filter arrays, different ones of the Bloom filter arrays representative of different sets of users who accessed media, and cardinality analysis circuitry to estimate, based on the inclusion-exclusion expression, the audience size of the user group of interest.

Example 14 includes the apparatus of example 13, wherein the processor circuitry is to instantiate argument generation circuitry to determine an argument for a logarithm based on the inclusion-exclusion expression, the cardinality analysis circuitry to estimate the audience size based on the logarithm.

Example 15 includes the apparatus of example 14, wherein the argument includes at least one of (i) a first ratio of a first count of array elements with a particular value in the first Bloom filter array to a length of the Bloom filter arrays or (ii) a second ratio of a second count of array elements with the particular value in a bitwise union of two or more of the Bloom filter arrays.

Example 16 includes the apparatus of example 15, wherein the particular value is example 0 includes example 17 includes the apparatus of example 15, wherein the argument includes the first ratio or the second ratio when the corresponding terms in the inclusion-exclusion expression are added, and the argument includes an inverse of the first ratio or an inverse of the second ratio when the corresponding terms in the inclusion-exclusion expression are subtracted.

Example 18 includes the apparatus of example 15, wherein the first ratio and the second ratio include respective exponents corresponding to respective constant coefficients in front of the corresponding terms in the inclusion-exclusion expression.

Example 19 includes the apparatus of example 13, wherein the expression generation circuitry is to identify a subset of mutually exclusive disjoint datasets associated with the different sets of users, the subset corresponding to the user group of interest, the inclusion-exclusion expression identified based on the subset.

Example 20 includes the apparatus of example 19, wherein the subset corresponds to all of the mutually exclusive disjoint datasets, all of the mutually exclusive disjoint datasets corresponding to a union of all the different sets of users.

Example 21 includes the apparatus of example 19, wherein the subset corresponds to less than a union of all the different sets of users.

Example 22 includes the apparatus of example 13, wherein the processor circuitry is to instantiate Bloom filter parameter analysis circuitry to determine a length for ones of the Bloom filter arrays that provide a relative error in the audience size estimate no greater than a relative error at a confidence level.

Example 23 includes the apparatus of example 13, wherein the processor circuitry is to instantiate Bloom filter parameter analysis circuitry to determine a relative error, at a confidence level, in the estimate of the audience size based on a length of ones of the Bloom filter arrays.

Example 24 includes the apparatus of example 13, wherein different ones of the Bloom filter arrays are generated by different computers of different database proprietors, different ones of the different sets of users corresponding to ones of the users registered with respective ones of the different database proprietors.

Example 25 includes an apparatus comprising expression generation circuitry to determine an inclusion-exclusion expression that defines an audience size for a user group of interest, terms in the inclusion-exclusion expression corresponding to either a first cardinality of a first one of at least three Bloom filter arrays or a second cardinality of a union of two or more of the Bloom filter arrays, different ones of the Bloom filter arrays representative of different sets of users who accessed media, and cardinality analysis circuitry to estimate, based on the inclusion-exclusion expression, the audience size of the user group of interest.

Example 26 includes the apparatus of example 25, further including argument generation circuitry to determine an argument for a logarithm based on the inclusion-exclusion expression, the cardinality analysis circuitry to estimate the audience size based on the logarithm.

Example 27 includes the apparatus of example 26, wherein the argument includes at least one of (i) a first ratio of a first count of array elements with a particular value in the first Bloom filter array to a length of the Bloom filter arrays or (ii) a second ratio of a second count of array elements with the particular value in a bitwise union of two or more of the Bloom filter arrays.

Example 28 includes the apparatus of example 27, wherein the particular value is example 0 includes example 29 includes the apparatus of example 27, wherein the argument includes the first ratio or the second ratio when the corresponding terms in the inclusion-exclusion expression are added, and the argument includes an inverse of the first ratio or an inverse of the second ratio when the corresponding terms in the inclusion-exclusion expression are subtracted.

Example 30 includes the apparatus of example 27, wherein the first ratio and the second ratio include respective exponents corresponding to respective constant coefficients in front of the corresponding terms in the inclusion-exclusion expression.

Example 31 includes the apparatus of example 25, wherein the expression generation circuitry is to identify a subset of mutually exclusive disjoint datasets associated with the different sets of users, the subset corresponding to the user group of interest, the inclusion-exclusion expression identified based on the subset.

Example 32 includes the apparatus of example 31, wherein the subset corresponds to all of the mutually exclusive disjoint datasets, all of the mutually exclusive disjoint datasets corresponding to a union of all the different sets of users.

Example 33 includes the apparatus of example 31, wherein the subset corresponds to less than a union of all the different sets of users.

Example 34 includes the apparatus of example 25, further including Bloom filter parameter analysis circuitry to determine a length for ones of the Bloom filter arrays that provide a relative error in the audience size estimate no greater than a relative error at a confidence level.

Example 35 includes the apparatus of example 25, further including Bloom filter parameter analysis circuitry to determine a relative error, at a confidence level, in the estimate of the audience size based on a length of ones of the Bloom filter arrays.

Example 36 includes the apparatus of example 25, wherein different ones of the Bloom filter arrays are generated by different computers of different database proprietors, different ones of the different sets of users corresponding to ones of the users registered with respective ones of the different database proprietors.

Example 37 includes At least one non-transitory computer readable medium comprising instructions that, when executed, cause at least one processor to at least determine an inclusion-exclusion expression that defines an audience size for a user group of interest, terms in the inclusion-exclusion expression corresponding to either a first cardinality of a first one of at least three Bloom filter arrays or a second cardinality of a union of two or more of the Bloom filter arrays, different ones of the Bloom filter arrays representative of different sets of users who accessed media, and estimate, based on the inclusion-exclusion expression, the audience size of the user group of interest.

Example 38 includes the at least one non-transitory computer readable medium of example 37, wherein the instructions cause the at least one processor to determine an argument for a logarithm based on the inclusion-exclusion expression, and estimate the audience size based on the logarithm.

Example 39 includes the at least one non-transitory computer readable medium of example 38, wherein the argument includes at least one of (i) a first ratio of a first count of array elements with a particular value in the first Bloom filter array to a length of the Bloom filter arrays or (ii) a second ratio of a second count of array elements with the particular value in a bitwise union of two or more of the Bloom filter arrays.

Example 40 includes the at least one non-transitory computer readable medium of example 39, wherein the particular value is example 0 includes example 41 includes the at least one non-transitory computer readable medium of example 39, wherein the argument includes the first ratio or the second ratio when the corresponding terms in the inclusion-exclusion expression are added, and the argument includes an inverse of the first ratio or an inverse of the second ratio when the corresponding terms in the inclusion-exclusion expression are subtracted.

Example 42 includes the at least one non-transitory computer readable medium of example 39, wherein the first ratio and the second ratio include respective exponents corresponding to respective constant coefficients in front of the corresponding terms in the inclusion-exclusion expression.

Example 43 includes the at least one non-transitory computer readable medium of example 37, wherein the instructions cause the at least one processor to identify a subset of mutually exclusive disjoint datasets associated with the different sets of users, the subset corresponding to the user group of interest, the inclusion-exclusion expression identified based on the subset.

Example 44 includes the at least one non-transitory computer readable medium of example 43, wherein the subset corresponds to all of the mutually exclusive disjoint datasets, all of the mutually exclusive disjoint datasets corresponding to a union of all the different sets of users.

Example 45 includes the at least one non-transitory computer readable medium of example 43, wherein the subset corresponds to less than a union of all the different sets of users.

Example 46 includes the at least one non-transitory computer readable medium of example 37, wherein the instructions cause the at least one processor to determine a length for ones of the Bloom filter arrays that provide a relative error in the audience size estimate no greater than a relative error at a confidence level.

Example 47 includes the at least one non-transitory computer readable medium of example 37, wherein the instructions cause the at least one processor to determine a relative error, at a confidence level, in the estimate of the audience size based on a length of ones of the Bloom filter arrays.

Example 48 includes the at least one non-transitory computer readable medium of example 37, wherein different ones of the Bloom filter arrays are generated by different computers of different database proprietors, different ones of the different sets of users corresponding to ones of the users registered with respective ones of the different database proprietors.

Example 49 includes an apparatus comprising means for generating an expression to determine an inclusion-exclusion expression that defines an audience size for a user group of interest, terms in the inclusion-exclusion expression corresponding to either a first cardinality of a first one of at least three Bloom filter arrays or a second cardinality of a union of two or more of the Bloom filter arrays, different ones of the Bloom filter arrays representative of different sets of users who accessed media, and means for estimating the audience size of the user group of interest based on the inclusion-exclusion expression.

Example 50 includes the apparatus of example 49, further including means for determining an argument for a logarithm based on the inclusion-exclusion expression, the estimating means to estimate the audience size based on the logarithm.

Example 51 includes the apparatus of example 50, wherein the argument includes at least one of (i) a first ratio of a first count of array elements with a particular value in the first Bloom filter array to a length of the Bloom filter arrays or (ii) a second ratio of a second count of array elements with the particular value in a bitwise union of two or more of the Bloom filter arrays.

Example 52 includes the apparatus of example 51, wherein the particular value is example 0 includes example 53 includes the apparatus of example 51, wherein the argument includes the first ratio or the second ratio when the corresponding terms in the inclusion-exclusion expression are added, and the argument includes an inverse of the first ratio or an inverse of the second ratio when the corresponding terms in the inclusion-exclusion expression are subtracted.

Example 54 includes the apparatus of example 51, wherein the first ratio and the second ratio include respective exponents corresponding to respective constant coefficients in front of the corresponding terms in the inclusion-exclusion expression.

Example 55 includes the apparatus of example 49, wherein the expression generating means is to identify a subset of mutually exclusive disjoint datasets associated with the different sets of users, the subset corresponding to the user group of interest, the inclusion-exclusion expression identified based on the subset.

Example 56 includes the apparatus of example 55, wherein the subset corresponds to all of the mutually exclusive disjoint datasets, all of the mutually exclusive disjoint datasets corresponding to a union of all the different sets of users.

Example 57 includes the apparatus of example 55, wherein the subset corresponds to less than a union of all the different sets of users.

Example 58 includes the apparatus of example 49, further including means for determining Bloom filter parameters, the Bloom filter parameters determining means to determine a length for ones of the Bloom filter arrays that provide a relative error in the audience size estimate no greater than a relative error at a confidence level.

Example 59 includes the apparatus of example 49, further including means for determining Bloom filter parameters, the Bloom filter parameters determining means to determine a relative error, at a confidence level, in the estimate of the audience size based on a length of ones of the Bloom filter arrays.

Example 60 includes the apparatus of example 49, wherein different ones of the Bloom filter arrays are generated by different computers of different database proprietors, different ones of the different sets of users corresponding to ones of the users registered with respective ones of the different database proprietors.

Example 61 includes a method comprising determining, by executing an instruction with at least one processor, an inclusion-exclusion expression that defines an audience size for a user group of interest, terms in the inclusion-exclusion expression corresponding to either a first cardinality of a first one of at least three Bloom filter arrays or a second cardinality of a union of two or more of the Bloom filter arrays, different ones of the Bloom filter arrays representative of different sets of users who accessed media, and estimating, based on the inclusion-exclusion expression, the audience size of the user group of interest.

Example 62 includes the method of example 61, further including determining an argument for a logarithm based on the inclusion-exclusion expression, and estimating the audience size based on the logarithm.

Example 63 includes the method of example 62, wherein the argument includes at least one of (i) a first ratio of a first count of array elements with a particular value in the first Bloom filter array to a length of the Bloom filter arrays or (ii) a second ratio of a second count of array elements with the particular value in a bitwise union of two or more of the Bloom filter arrays.

Example 64 includes the method of example 63, wherein the particular value is example 0 includes example 65 includes the method of example 63, wherein the argument includes the first ratio or the second ratio when the corresponding terms in the inclusion-exclusion expression are added, and the argument includes an inverse of the first ratio or an inverse of the second ratio when the corresponding terms in the inclusion-exclusion expression are subtracted.

Example 66 includes the method of example 63, wherein the first ratio and the second ratio include respective exponents corresponding to respective constant coefficients in front of the corresponding terms in the inclusion-exclusion expression.

Example 67 includes the method of example 61, further including identifying a subset of mutually exclusive disjoint datasets associated with the different sets of users, the subset corresponding to the user group of interest, the inclusion-exclusion expression identified based on the subset.

Example 68 includes the method of example 67, wherein the subset corresponds to all of the mutually exclusive disjoint datasets, all of the mutually exclusive disjoint datasets corresponding to a union of all the different sets of users.

Example 69 includes the method of example 67, wherein the subset corresponds to less than a union of all the different sets of users.

Example 70 includes the method of example 61, further including determining a length for ones of the Bloom filter arrays that provide a relative error in the audience size estimate no greater than a relative error at a confidence level.

Example 71 includes the method of example 61, further including determining a relative error, at a confidence level, in the estimate of the audience size based on a length of ones of the Bloom filter arrays.

Example 72 includes the method of example 61, wherein different ones of the Bloom filter arrays are generated by different computers of different database proprietors, different ones of the different sets of users corresponding to ones of the users registered with respective ones of the different database proprietors.

Although certain example systems, methods, apparatus and articles of manufacture have been disclosed herein, the scope of coverage of this patent is not limited thereto. On the contrary, this patent covers all systems, methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
communications interface circuitry to:
  transmit, via first network communications, bloom filter parameters to a first database proprietor, a second database proprietor, and a third database proprietor;
  receive, via second network communications, first, second, and third Bloom filter arrays generated by respective first, second, and third servers of respective ones of the first, second, and third database proprietors, each of the first, second, and third Bloom filter arrays having a length, the length defined by the bloom filter parameters, different ones of the first, second, and third Bloom filter arrays representative of different sets of users registered with respective ones of the first, second, and third database proprietors and that accessed media, the first, second, and third Bloom filter arrays including differential privacy noise, the first, second, and third Bloom filter arrays generated to maintain a privacy of the different sets of users such that duplication of the users across the different sets of users cannot be directly determined from the Bloom filter array to determine of an audience size across the different sets of users;
at least one memory;
instructions; and
programmable circuitry to execute and/or instantiate the instructions to:
  determine, by executing a numerical solver, the length defined by the Bloom filter parameters provided to the first, second, and third database proprietors, the length determined to correspond to a minimum length to provide a first relative error in an estimate of the audience size no greater than a second relative error at a confidence level;
  determine an inclusion-exclusion expression that defines the audience size for a user group of interest, terms in the inclusion-exclusion expression corresponding to either a first cardinality of the first Bloom filter array or a second cardinality of a union of two or more of the first, second, and third Bloom filter arrays;
  estimate, based on the inclusion-exclusion expression, the audience size of the user group of interest that accounts for the duplication of the users across the different sets of users, the length determined to reduce at least one of memory requirements to store data associated with processing of the first, second, and third Bloom filter arrays or processing requirements to implement the estimation relative to a longer length for the first, second, and third Bloom filter arrays; and
  cause the communications interface circuitry to transmit, via a third network communication, a report based on the estimate of the audience size to a third-party entity.

2. The apparatus of claim 1, wherein the programmable circuitry is to:
determine an argument for a logarithm based on the inclusion-exclusion expression; and
estimate the audience size based on the logarithm.

3. The apparatus of claim 2, wherein the argument includes at least one of (i) a first ratio of a first count of array elements with a particular value in the first Bloom filter array to the length of the first, second, and third Bloom filter arrays or (ii) a second ratio of a second count of array elements with the particular value in a bitwise union of two or more of the first, second, and third Bloom filter arrays.

4. The apparatus of claim 3, wherein the particular value is 0.

5. The apparatus of claim 3, wherein the argument includes the first ratio or the second ratio when the corresponding terms in the inclusion-exclusion expression are added, and the argument includes an inverse of the first ratio or an inverse of the second ratio when the corresponding terms in the inclusion-exclusion expression are subtracted.

6. The apparatus of claim 3, wherein the first ratio and the second ratio include respective exponents corresponding to respective constant coefficients in front of the corresponding terms in the inclusion-exclusion expression.

7. The apparatus of claim 1, wherein the programmable circuitry is to identify a subset of mutually exclusive disjoint datasets associated with the different sets of users, the subset corresponding to the user group of interest, the inclusion-exclusion expression identified based on the subset.

8. The apparatus of claim 7, wherein the subset corresponds to all of the mutually exclusive disjoint datasets, all of the mutually exclusive disjoint datasets corresponding to a union of all the different sets of users.

9. The apparatus of claim 7, wherein the subset corresponds to less than a union of all the different sets of users.

10. The apparatus of claim 1, wherein the communications interface circuitry is to receive one or more additional Bloom filter arrays, and the programmable circuitry is to estimate the audience size based on the one or more additional Bloom filter arrays.

11. An apparatus comprising:
communications interface circuitry to:
transmit, via first network communications, bloom filter parameters to a first database proprietor, a second database proprietor, and a third database proprietor;
receive, via second network communications, first, second, and third Bloom filter arrays generated by respective first, second, and third servers of respective ones of the first, second, and third database proprietors, each of the first, second, and third Bloom filter arrays having a length, the length defined by the bloom filter parameters, different ones of the first, second, and third Bloom filter arrays representative of different sets of users registered with respective ones of the first, second, and third database proprietors and corresponding to media accesses, the first, second, and third Bloom filter arrays including differential privacy noise, the first, second, and third Bloom filter arrays generated to maintain a privacy of the different sets of users such that duplication of the users across the different sets of users cannot be directly determined from the Bloom filter arrays to determine an audience size across the different sets of users;
at least one memory; and
programmable circuitry including one or more of:
at least one of a central processing unit, a graphic processing unit, or a digital signal processor, the at least one of the central processing unit, the graphic processing unit, or the digital signal processor having control circuitry to control data movement within the processor circuitry, arithmetic and logic circuitry to perform one or more first operations corresponding to instructions, and one or more registers to store a result of the one or more first operations, the instructions in the apparatus;
a Field Programmable Gate Array (FPGA), the FPGA including first logic gate circuitry, a plurality of configurable interconnections, and storage circuitry, the first logic gate circuitry and the interconnections to perform one or more second operations corresponding to the instructions, the storage circuitry to store a result of the one or more second operations; or
Application Specific Integrate Circuitry (ASIC) including second logic gate circuitry to perform one or more third operations corresponding to the instructions;
the programmable circuitry to perform at least one of the first operations, the second operations or the third operations to instantiate:
Bloom filter parameter analysis circuitry to determine, by implementing a numerical solver, the defined by the Bloom filter parameters provided to the first, second, and third database proprietors, the length determined to correspond to a minimum length to provide a first relative error in an estimate of the audience size no greater than a second relative error at a confidence level;
expression generation circuitry to determine an inclusion-exclusion expression that defines the audience size for a user group of interest, terms in the inclusion-exclusion expression corresponding to either a first cardinality of the first Bloom filter array or a second cardinality of a union of two or more of the first, second, and third Bloom filter arrays; and
cardinality analysis circuitry to estimate, based on the inclusion-exclusion expression, the audience size of the user group of interest that accounts for the duplication of the users across the different sets of users, the length determined to reduce at least one of memory requirements to store data associated with processing of the first, second, and third Bloom filter arrays or processing requirements to implement the estimation relative to a longer length for the first, second, and third Bloom filter arrays, the communications interface circuitry to transmit, via a third network communication, a report based on the estimate of the audience size to a third-party entity.

12. The apparatus of claim 11, wherein the programmable circuitry is to instantiate argument generation circuitry to determine an argument for a logarithm based on the inclusion-exclusion expression, the cardinality analysis circuitry to estimate the audience size based on the logarithm.

13. The apparatus of claim 12, wherein the argument includes at least one of (i) a first ratio of a first count of array elements with a particular value in the first Bloom filter array to the length of the first, second, and third Bloom filter arrays or (ii) a second ratio of a second count of array elements with the particular value in a bitwise union of two or more of the first, second, and third Bloom filter arrays.

14. The apparatus of claim 11, wherein the expression generation circuitry is to identify a subset of mutually exclusive disjoint datasets associated with the different sets of users, the subset corresponding to the user group of interest, the inclusion-exclusion expression identified based on the subset.

15. The apparatus of claim 14, wherein the subset corresponds to all of the mutually exclusive disjoint datasets, all of the mutually exclusive disjoint datasets corresponding to a union of all the different sets of users.

16. The apparatus of claim 13, wherein the particular value is 0.

17. The apparatus of claim 13, wherein the argument includes the first ratio or the second ratio when the corresponding terms in the inclusion-exclusion expression are added, and the argument includes an inverse of the first ratio or an inverse of the second ratio when the corresponding terms in the inclusion-exclusion expression are subtracted.

18. The apparatus of claim 13, wherein the first ratio and the second ratio include respective exponents corresponding to respective constant coefficients in front of the corresponding terms in the inclusion-exclusion expression.

19. The apparatus of claim 14, wherein the subset corresponds to less than a union of all the different sets of users.

20. The apparatus of claim 11, wherein the communications interface circuitry is to receive one or more additional Bloom filter arrays, and the cardinality analysis circuitry is to estimate the audience size based on the one or more additional Bloom filter arrays.

21. At least one non-transitory computer readable medium comprising instructions to cause programmable circuitry to at least:
cause, via first network communications, transmission of bloom filter parameters to a first database proprietor, a second database proprietor, and a third database proprietor;
access first, second, and third Bloom filter arrays received via second network communications and generated by respective first, second, and third servers of respective ones of the first, second, and third database proprietors, each of the first, second, and third Bloom filter arrays having a length, the length defined by the bloom filter parameters, different ones of the first, second, and third Bloom filter arrays representative of different sets of users registered with respective ones of the first, second, and third database proprietors and corresponding to media accesses, the first, second, and third Bloom filter arrays including differential privacy noise, the first, second, and third Bloom filter arrays generated to maintain a privacy of the different sets of users such that duplication of the users across the different sets of users cannot be directly determined from the Bloom filter arrays to determine an audience size across the different sets of users;

determine, by implementing a numerical solver, the length defined by the Bloom filter parameters provided to the first, second, and third database proprietors, the length determined to correspond to a minimum length to provide a first relative error in an estimate of the audience size no greater than a second relative error at a confidence level;

determine an inclusion-exclusion expression that defines the audience size for a user group of interest, terms in the inclusion-exclusion expression corresponding to either a first cardinality of the first Bloom filter array or a second cardinality of a union of two or more of the first, second, and third Bloom filter arrays;

estimate, based on the inclusion-exclusion expression, the audience size of the user group of interest that accounts for the duplication of the users across the different sets of users, the length determined to reduce at least one of memory requirements to store data associated with processing of the first, second, and third Bloom filter arrays or processing requirements to implement the estimation relative to a longer length for the first, second, and third Bloom filter arrays; and cause, via a third network communication, transmission of a report based on the estimate of the audience size to a third-party entity.

22. The at least one non-transitory computer readable medium of claim 21, wherein the instructions cause the programmable circuitry to:
determine an argument for a logarithm based on the inclusion-exclusion expression; and
estimate the audience size based on the logarithm.

23. The at least one non-transitory computer readable medium of claim 22, wherein the argument includes at least one of (i) a first ratio of a first count of array elements with a particular value in the first Bloom filter array to the length of the first, second, and third Bloom filter arrays or (ii) a second ratio of a second count of array elements with the particular value in a bitwise union of two or more of the first, second, and third Bloom filter arrays.

24. The at least one non-transitory computer readable medium of claim 23, wherein the particular value is 0.

25. The at least one non-transitory computer readable medium of claim 23, wherein the argument includes the first ratio or the second ratio when the corresponding terms in the inclusion-exclusion expression are added, and the argument includes an inverse of the first ratio or an inverse of the second ratio when the corresponding terms in the inclusion-exclusion expression are subtracted.

26. The at least one non-transitory computer readable medium of claim 23, wherein the first ratio and the second ratio include respective exponents corresponding to respective constant coefficients in front of the corresponding terms in the inclusion-exclusion expression.

27. The at least one non-transitory computer readable medium of claim 21, wherein the instructions cause the programmable circuitry to identify a subset of mutually exclusive disjoint datasets associated with the different sets of users, the subset corresponding to the user group of interest, the inclusion-exclusion expression identified based on the subset.

28. The at least one non-transitory computer readable medium of claim 27, wherein the subset corresponds to all of the mutually exclusive disjoint datasets, all of the mutually exclusive disjoint datasets corresponding to a union of all the different sets of users.

29. The at least one non-transitory computer readable medium of claim 27, wherein the subset corresponds to less than a union of all the different sets of users.

30. The at least one non-transitory computer readable medium of claim 21, wherein the instructions cause the programmable circuitry to:
access one or more additional Bloom filter arrays; and
estimate the audience size based on the one or more additional Bloom filter arrays.

\* \* \* \* \*